United States Patent
Nakagomi et al.

(10) Patent No.: US 8,824,552 B2
(45) Date of Patent: Sep. 2, 2014

(54) MOTION PICTURE ENCODING DEVICE AND MOTION PICTURE ENCODING PROCESSING PROGRAM

(75) Inventors: Kouichi Nakagomi, Higashimurayama (JP); Akira Hamada, Sagamihara (JP); Shinichi Matsui, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 143 days.

(21) Appl. No.: 13/351,711

(22) Filed: Jan. 17, 2012

(65) Prior Publication Data

US 2012/0114035 A1    May 10, 2012

Related U.S. Application Data

(63) Continuation of application No. 11/504,021, filed on Aug. 14, 2006, now Pat. No. 8,121,193, which is a continuation of application No. PCT/JP2005/020689, filed on Nov. 4, 2005.

(30) Foreign Application Priority Data

Nov. 4, 2004    (JP) ................. 2004-320088

(51) Int. Cl.
*H04N 7/34* (2006.01)
*H04N 7/36* (2006.01)
*H04N 7/40* (2006.01)
*H04N 7/26* (2006.01)
*H04N 7/50* (2006.01)

(52) U.S. Cl.
CPC ... *H04N 19/00145* (2013.01); *H04N 19/00042* (2013.01); *H04N 19/00278* (2013.01); *H04N 19/00357* (2013.01); *H04N 7/5086* (2013.01); *H04N 19/00036* (2013.01); *H04N 19/00018* (2013.01)
USPC .............................. 375/240.13; 375/240.27

(58) Field of Classification Search
CPC ............... H04N 7/5086; H04N 7/50–7/5093
USPC ......................................................... 375/240
See application file for complete search history.

(56) References Cited

U.S. PATENT DOCUMENTS

| | | | |
|---|---|---|---|
| 4,837,618 A | 6/1989 | Hatori et al. | |
| 5,387,938 A | 2/1995 | Fukuda et al. | |

(Continued)

FOREIGN PATENT DOCUMENTS

| | | | |
|---|---|---|---|
| JP | 63-121372 A | 5/1988 | |
| JP | 5-236462 A | 9/1993 | |

(Continued)

OTHER PUBLICATIONS

Dubois et al. "Noise Reduction in Image Sequences Using Motion Compensated Temporal Filtering" (Jul. 1984) IEEE Trans. on Com. vol. 32, No. 7.*

(Continued)

*Primary Examiner* — Sath V Perungavoor
*Assistant Examiner* — Matthew J Anderson
(74) *Attorney, Agent, or Firm* — Holtz Holtz Goodman & Chick PC

(57) ABSTRACT

The minimum Sum of Absolute Differences obtained by a motion vector search roughly judges the magnitude of quantization error by whether or not exceeding a predetermined threshold value. When the quantization error is lower, whether or not visually noticeable noise exists in some of the pixels of the current macroblock is judged based on the amount of flatness and noise detected in each of the 4×4 pixel blocks of the current macroblock partitioned into 16 sub-macroblocks. If there is visually noticeable noise, intra-frame coding is selected. When the quantization error is higher, whether or not visually noticeable noise exists in the current macroblock is judged while considering the magnitude of the motion vector. If there is visually noticeable noise, intra-frame coding is selected.

9 Claims, 15 Drawing Sheets

(56) References Cited

U.S. PATENT DOCUMENTS

| | | | |
|---|---|---|---|
| 5,436,665 A | 7/1995 | Ueno et al. | |
| 5,552,823 A | 9/1996 | Kageyama | |
| 5,724,097 A * | 3/1998 | Hibi et al. | 375/240.04 |
| 5,751,358 A | 5/1998 | Suzuki et al. | |
| 5,929,915 A | 7/1999 | Cho | |
| 5,969,777 A | 10/1999 | Mawatari | |
| 6,011,589 A | 1/2000 | Matsuura et al. | |
| 6,040,865 A | 3/2000 | Kato et al. | |
| 6,151,360 A | 11/2000 | Kato et al. | |
| 6,295,089 B1 * | 9/2001 | Hoang | 348/390.1 |
| 6,415,057 B1 | 7/2002 | Suzuki et al. | |
| 6,442,202 B1 * | 8/2002 | Borer | 375/240.16 |
| 6,594,790 B1 * | 7/2003 | Sato et al. | 714/746 |
| 6,625,211 B1 | 9/2003 | Etoh et al. | |
| 6,819,713 B1 | 11/2004 | Sato | |
| 6,831,947 B2 * | 12/2004 | Ribas Corbera | 375/240.03 |
| 7,161,982 B2 | 1/2007 | Kimoto | |
| 7,173,971 B2 | 2/2007 | Amara et al. | |
| 7,266,148 B2 * | 9/2007 | Kim | 375/240.03 |
| 7,944,971 B1 * | 5/2011 | Pun et al. | 375/240.13 |
| 8,031,946 B2 * | 10/2011 | Nagori | 382/199 |
| 8,514,935 B2 * | 8/2013 | Maruyama | 375/240.12 |
| 2002/0159526 A1 * | 10/2002 | Hekstra | 375/240.15 |
| 2002/0172282 A1 | 11/2002 | Kato | |
| 2004/0095511 A1 * | 5/2004 | Amara et al. | 348/620 |
| 2004/0120597 A1 * | 6/2004 | Le Dinh | 382/261 |
| 2006/0188014 A1 * | 8/2006 | Civanlar et al. | 375/240.03 |
| 2006/0204115 A1 * | 9/2006 | Burazerovic | 382/239 |

FOREIGN PATENT DOCUMENTS

| | | |
|---|---|---|
| JP | 10-079948 A | 3/1998 |
| JP | 2000-138937 A | 5/2000 |
| JP | 2003-037844 A | 2/2003 |

OTHER PUBLICATIONS

Dubois, Eric "Motion Compensated Filtering of Time Varying Images" (1992) Multidimensional Systems and Signal Processing, 3, 211-239.*

* cited by examiner

PRIOR ART

PRIOR ART

PRIOR ART

PRIOR ART

PRIOR ART

PRIOR ART

PRIOR ART

MOTION PICTURE ENCODING DEVICE AND MOTION PICTURE ENCODING PROCESSING PROGRAM

CROSS-REFERENCE TO RELATED APPLICATION

This is a Continuation of U.S. application Ser. No. 11/504,021, filed Aug. 14, 2006, now U.S. Pat. No. 8,121,193 which is a Continuation Application of PCT Application No. PCT/JP2005/020689, filed Nov. 4, 2005.

BACKGROUND OF THE INVENTION

1. Field of the Invention

The present invention relates to a motion picture encoding device and associated motion picture encoding processing program which compresses motion images in view of human visual characteristics.

2. Description of the Related Art

In applications, such as digital television broadcasting, Internet video streaming, DVD, etc., a coding technique with a high compression ratio is required because transmission bandwidth and storage capacity are limited. For instance, an H.264 standard is known as a high compression coding technique which meets such a requirement. Hereinafter, an example of a motion picture encoding device based on the H.264 standard will be described with reference to FIG. 9~FIG. 15.

FIG. 9 is a block diagram showing an outline configuration of a motion picture encoding device. A subtracter 10 generates a prediction error signal indicating luminance difference by subtracting the prediction block pixel value from the current block pixel value. A quantization/transform section 11 applies integer DCT (Discrete Cosine Transform) to the prediction error signal outputted from the subtracter 10 and a transform coefficient is obtained. Furthermore, this transform coefficient is quantized with a predetermined quantization width and coefficient data is generated. An entropy encoder section 12 performs entropy encoding of the coefficient data generated by the quantization/transform section 11 with Exponential-Golomb codes based on Variable Length Codes (VLC) and applies CABAC (Context-based Adaptive Binary Arithmetic Coding).

An inverse quantization/inverse transform section 13, an adder 14, a loop filter 15 and a frame memory 16 form a local decoding portion. The local decoding portion applies inverse quantization and inverse integer DCT to the coefficient data generated in the quantization/transform section 11, adds the previous prediction block pixel value and generates a decoded image. Further, after the local decoding portion reduces block noise by performing loop filtering to the generated decoded image, it is temporarily stored in the frame memory 16. An intra-frame prediction section 17 calculates the intra-frame prediction block value using the decoded image read out from the frame memory 16.

A motion detection section 18 detects the motion vector of the current block. A motion compensation section 19 calculates the inter-frame prediction block value by performing motion compensation to the reference frame (decoded image read out from the frame memory 16) corresponding to the motion vector detected by the motion detection section 18. A selector 20 selects either the intra-frame prediction block value calculated by the intra-frame prediction section 17 or the inter-frame prediction block value calculated by the motion compensation section 19 corresponding to instructions of a determination section 21 and provides the respective value to the subtracter 10. The determination section 21 estimates the amount of coded data at the time of intra-frame predictive coding as well as the amount of coded data of inter-frame predictive coding and directs the selector 20 to select the coding mode with the smaller amount of coded data.

Next, the operations of the encoding determination processing of the motion picture encoding device according to the above-mentioned configuration will be explained with reference to FIGS. 10 through 15. In the following, after first explaining the operations of the "encoding determination processing", the separate operations of the "inter-prediction processing", the "intra-prediction processing" and the "inter D&Q processing" which encompass the encoding determination processing will be outlined.

(1) Operations of the Encoding Determination Processing

FIG. 10 is a flow chart showing operations of the encoding determination processing executed for each input macroblock. This processing is initiated by inputting a 16×16 macroblock image (hereinafter, denoted as "input macroblock"). In Step SF1, each section of the device is initialized. Secondly, in Step SF2, the amount of coded data at the time of inter-frame predictive coding is estimated by the execution of inter-prediction processing. Next, in Step SF3, the amount of coded data for intra-frame predictive coding is estimated and further intra-frame coding (integer DCT, quantization, inverse quantization and inverse integer DCT) is performed by the execution of intra-prediction processing. Then, in Step SF4, the minimum Sum of Absolute Differences SADinter (this is equivalent to the amount of coded data at inter-prediction) obtained in the above-mentioned Step SF2 is judged as to whether or not greater than the minimum Sum of Absolute Differences SADintra (this is equivalent to the amount of coded data at intra-prediction) obtained in the above-mentioned Step SF3.

When the amount of coded data at inter-prediction is greater than the amount of coded data at intra-prediction, the judgment result becomes "YES" and completes this processing. Accordingly, in this case the motion picture encoding device performs video compression with the intra-frame coding executed in the above-mentioned Step SF3.

Conversely, when the amount of coded data at the time of inter-prediction is less than the amount of coded data at the time of intra-prediction, the judgment result of the above-mentioned Step SF4 becomes "NO" and the flow advances to Step SF5, which executes inter D&Q processing to perform inter-frame coding (integer DCT, quantization, inverse quantization and inverse integer DCT). Accordingly, in this case the motion picture encoding device performs video compression with inter-frame coding.

(2) Operations of the Inter-Prediction Processing

Next, the operations of the inter-prediction processing will be explained with reference to FIGS. 11 through 13. When processing has been executed via the above-mentioned Step SF2 (refer to FIG. 10), the flow advances to Step SG1 shown in FIG. 11 and judges whether or not processing has been completed for all of the 4×4 pixel blocks of a 16×16 pixel macroblock partitioned into 16 sub-macroblocks. When processing for all the blocks has been completed, the judgment result becomes "YES" and this processing is completed. Otherwise, the judgment result becomes "NO" and the flow advances to Step SG2.

Additionally, with regard to the association between a 16×16 pixel macroblock and the 4×4 pixel blocks, as illustrated in FIG. 13, the 4×4 pixel blocks within the macroblock are denoted by the block number n.

Next, in Step SG2, a 4×4 pixel block processing object (hereinafter, denoted as the "current block") pixel value Org is calculated. Subsequently, in Step SG3, MV search processing is executed which searches for a motion vector (MV). In the MV search processing, as shown in Steps SH1~SH3 of FIG. 12, correlation of the current block is calculated while shifting pixels in the center of the reference block within a search region of the reference frame. Amongst those pixels, the pixel position with the highest correlation (similarity) is extracted as the best motion vector.

MV search processing estimates the correlation of the reference block and the current block with the Sum of Absolute Differences SAD between both blocks. Accordingly, when the pixel position of the highest correlation is extracted as the motion vector, the Sum of Absolute Differences SAD represents the minimum. The minimum Sum of Absolute Differences SADinter is used for Step SF4 (refer to FIG. 10) for judging whether or not to execute inter D&Q processing.

(3) Operations of the Intra-Prediction Processing

Next, the operations of the intra-prediction processing will be explained with reference to FIG. 14. When inter-prediction processing has been executed via Step SF3 mentioned above (refer to FIG. 10), the flow advances to Step SJ1 shown in FIG. 14. In Step SJ1, whether or not processing has been completed for all 4×4 pixel blocks of a 16×16 pixel macroblock partitioned into 16 sub-macroblocks is judged. When processing for all the blocks has been completed, the judgment result becomes "YES" and this processing is completed. Otherwise, the judgment result becomes "NO" and the flow advances to Step SJ2. In Step SJ2, for example in intra 4×4 mode, a prediction block value for each mode amongst a total of nine optional prediction modes is calculated, which are referred to as mode0~mode8.

Subsequently, in Steps SJ3~SJ5, the current block Sum of Absolute Differences SAD and the prediction block value for each of the above-mentioned modes is calculated, respectively, and the minimum Sum of Absolute Differences SADintra is obtained from within these results. The minimum Sum of Absolute Differences SADintra is used for Step SF4 (refer to FIG. 10) for judging whether or not to execute inter D&Q processing.

When the minimum Sum of Absolute Differences SAD has been determined, the judgment result in Step SJ3 becomes "YES" and the flow advances to Step SJ6. In Step SJ6, intra-frame coding of the current block is performed using the mode which produces the minimum Sum of Absolute Differences SADintra. Hereinafter, the above-mentioned Steps SJ1~SJ6 are repeated until processing for all blocks is completed.

(4) Operations of the Inter D&Q Processing

Next, the operations of the inter D&Q processing will be explained with reference to FIG. 15. When processing has been executed via Step SF5 mentioned above (refer to FIG. 10), the flow advances to Step SK1 shown in FIG. 15 and whether or not processing has been completed for all of the 4×4 pixel blocks of a 16×16 pixel macroblock partitioned into 16 sub-macroblocks is judged. If processing has not been completed for all the blocks, the judgment result becomes "NO" and the flow advances to Step SK2.

In Steps SK2~SK6, the inter-frame prediction block value ref (i, j) is subtracted from the current block pixel value Org (i, j) and proceeds to execute transform processing (integer DCT), quantization processing Q, inverse quantization processing Q-1 and inverse transform processing (inverse integer DCT-1) to the produced prediction error signal. Then, the flow advances to Step SK7. Because of the stepping performed in the inter-frame prediction block value ref (i, j), processing will revert to the above-mentioned Step SK1. Hereafter, the above-mentioned Steps SK1~SK7 are repeated until processing for all the blocks is completed.

As described above, the motion picture encoding device performs video compression by selectively using either intra-frame coding by correlation in a spatial domain or inter-frame coding by correlation in a temporal domain. A magnitude comparison is executed for each input macroblock between the minimum Sum of Absolute Differences SADinter that is equivalent to the amount of coded data at the time of inter-prediction and the minimum Sum of Absolute Differences SADintra that is equivalent to the amount of coded data at the time of intra-prediction. The coding mode with the smaller Sum of Absolute Differences SAD is selected and compression encoding is performed.

Apart from that, in order to obtain the minimum Sum of Absolute Differences SADintra equivalent to the amount of coded data at the time of intra-prediction, for example, when intra 4×4 mode is selected, it is necessary to calculate the prediction block value for each mode amongst a total of nine optional prediction modes, which are referred to as mode0~mode8. This situation causes an exponential increase in the calculation amount. Furthermore, the coding technique by the H.264 standard has been described in the conventional prior art, for example, as disclosed by Iain E. G. Richardson "H.264 and MPEG-4 Video Compression: Video Coding for Next-generation Multimedia", Publisher: John Wiley & Sons, Ltd. (December 2003, First Edition) "6.H.264/MPEG-4 Part 10" (p 159~p 223) (ISBN: 0470869607).

There are the following issues concerning motion picture encoding devices which perform video compression by selectively using intra-frame coding and inter-frame coding mentioned above.

(a) In many cases intra-frame coding is not selected, except in a case where there is a noticeable difference between an inputted image as compared with a reference image, for example, when a scene changes, when a motion vector has not been detected properly or when there is a substantial luminance variation due to a camera flash, etc. For this reason, there is a problem in that the complexity and number of calculations required for intra-prediction processing (refer to FIG. 14) is simply excessive.

(b) Because a coding determination is performed which uniquely selects either intra-frame coding/inter-frame coding only by a magnitude comparison of the amount of coded data, human visual characteristics are not taken into consideration. This is commonly referred to as the Human Visual System (HVS), the system by which a human eye and brain perceive and interpret visual images. Therefore, there is the possibility of inviting significantly reduced image quality that can easily develop into an image with noticeable noise (luma and chroma noise), such as in the case of quantization error propagation being generated at the time of a motion vector search whereby a fast search algorithm may become 'trapped' in a local minimum giving a suboptimal result or during coding at a low bit rate whereby distortion increases the respective quantization value. A local minimum is the concept of a minimum value in a defined section (area) of a block. For instance, this may not be the true global minimum value and is commonly referred to as a false minimum value (false minima).

Consequently, the present invention has been made in view of the above-described circumstances with the purpose of providing a motion picture encoding device and associated motion picture encoding processing program, wherein wasteful calculations will not be performed and coding modes can be determined at a faster speed in view of human visual characteristics.

Furthermore, the present invention aims at providing a motion picture encoding device and motion picture encoding processing program which can rapidly stop quantization error propagation when 'trapped' in a local minimum as well as avoid reduced image quality.

SUMMARY OF THE INVENTION

In accordance with a first aspect of the present invention, there is provided a motion picture encoding device which selects either intra-frame coding or inter-frame coding and performs video compression, comprising: a coding determination means for judging the existence of a block image having visually noticeable noise when performing inter-frame coding for a block image of a partitioned macroblock image to encode and selecting intra-frame coding if an applicable block image exists.

In accordance with a second aspect of the present invention, there is provided a motion picture encoding device which selects either intra-frame coding or inter-frame coding and performs video compression, comprising: a first coding determination means for judging the existence of a block image having visually noticeable noise when performing inter-frame coding for a block image of a partitioned macroblock image to encode and selecting intra-frame coding if an applicable block image exists; and a second coding determination means for judging the existence of a block image having visually noticeable noise while considering the magnitude of a motion vector obtained by inter-frame prediction and selecting intra-frame coding if an applicable block image exists.

In accordance with a third aspect of the present invention, there is provided a motion picture encoding device which selects either intra-frame coding or inter-frame coding and performs video compression, comprising: an error estimation means for estimating the magnitude of quantization error of an entire macroblock image to encode using an assessment value obtained by a motion vector search at the time of inter-frame prediction; a detection means for detecting flatness and quantization error for each block image when performing inter-frame coding for a block image of a partitioned macroblock image; a first coding determination means for judging the existence of a block image having visually noticeable noise from the comparison of flatness and quantization error detected by the detection means when the estimated quantization error by the error estimation means is less than a predetermined value and selecting intra-frame coding if an applicable block image exists; and a second coding determination means for judging the existence of a block image having visually noticeable noise from the estimated quantization error when the estimated quantization error by the error estimation means is greater than a predetermined value and selecting intra-frame coding if an applicable block image exists.

In accordance with a fourth aspect of the present invention, there is provided a motion picture encoding device which selects either intra-frame coding or inter-frame coding and performs video compression, comprising: an error estimation means for estimating the magnitude of quantization error of an entire macroblock image to encode using an assessment value obtained by a motion vector search at the time of inter-frame prediction; a first coding determination means for detecting flatness and quantization error for each block image when performing inter-frame coding by a block image of a partitioned macroblock image, judging the existence of a block image having visually noticeable noise from the comparison of detected flatness and quantization error when the estimated quantization error by the error estimation means is less than a predetermined value and selecting intra-frame coding if an applicable block image exists; and a second coding determination means for judging the existence of a block image having visually noticeable noise from an estimated quantization error when the estimated quantization error by the error estimation means is greater than a predetermined value and selecting intra-frame coding if an applicable block image exists.

In accordance with a fifth aspect of the present invention, there is provided a motion picture encoding device which selects either intra-frame coding or inter-frame coding and performs video compression, comprising: an error estimation means for estimating the magnitude of quantization error of an entire macroblock image to encode using an assessment value obtained by a motion vector search at the time of inter-frame prediction; a first coding determination means for calculating flatness of an entire macroblock image and judging the flatness as to whether or not there is visually noticeable noise when the estimated quantization error by the error estimation means is less than a predetermined value, wherein if there is no visually noticeable noise selects inter-frame coding and conversely, if there is visually noticeable noise selects intra-frame coding; and a second coding determination means for judging whether or not visually noticeable noise exists in a macroblock image from an estimated quantization error when the estimated quantization error by the error estimation means is greater than a predetermined value, wherein if there is no visually noticeable noise selects inter-frame coding and conversely, if there is visually noticeable noise selects intra-frame coding.

In accordance with a sixth aspect of the present invention, the second coding determination means judges existence of a block image having visually noticeable noise while considering the magnitude of a motion vector obtained by inter-frame prediction.

In accordance with a seventh aspect of the present invention, an assessment value obtained by a motion vector search at the time of the inter-frame prediction is the Sum of Absolute Differences when detecting a motion vector with the highest correlation.

In accordance with an eighth aspect of the present invention, there is provided a motion picture encoding device which selects either intra-frame coding or inter-frame coding and performs video compression, comprising: a detection means for detecting the magnitude of quantization error of an entire macroblock image, as well as detecting flatness and quantization error for each block image when performing inter-frame coding by a block image of a partitioned macroblock image; a first coding determination for judging the existence of a block image having visually noticeable noise from the comparison of detected flatness and quantization error when a quantization error of an entire macroblock image detected by the detection means is less than a predetermined value and selecting intra-frame coding if an applicable block image exists; and a second coding determination means for judging the existence of a block image having visually noticeable noise while considering the magnitude of a motion vector obtained by inter-frame prediction when the quantization error of an entire macroblock image detected by the detection means is greater than a predetermined value and selecting intra-frame coding if an applicable block image exists.

In accordance with a ninth aspect of the present invention, there is provided a motion picture encoding processing program which selects either intra-frame coding or inter-frame coding and performs video compression, wherein the motion picture encoding processing program executes encoding determination processing by a processor, comprising the steps of: judging the existence of a block image having visually noticeable noise when performing inter-frame coding by a block image of a partitioned macroblock image to encode; and selecting intra-frame coding if an applicable block image exists.

In accordance with a tenth aspect of the present invention, there is provided a motion picture encoding processing program which selects either intra-frame coding or inter-frame coding and performs video compression, wherein the motion picture encoding processing program executes encoding determination processing by a processor, comprising the steps of: a first encoding determination process for judging the existence of a block image having visually noticeable noise when performing inter-frame coding by a block image of a partitioned macroblock image to encode and selecting intra-frame coding if an applicable block image exists; and a second encoding determination process for judging the existence of a block image having visually noticeable noise while considering the magnitude of a motion vector obtained by inter-frame prediction and selecting intra-frame coding if an applicable block image exists.

In accordance with an eleventh aspect of the present invention, there is provided a motion picture encoding processing program which selects either intra-frame coding or inter-frame coding and performs video compression, wherein the motion picture encoding processing program executes encoding determination processing by a processor, comprising the steps of: an error estimation process for estimating the magnitude of quantization error of an entire macroblock image to encode using an assessment value obtained by a motion vector search at the time of inter-frame prediction; a detection process for detecting flatness and quantization error for each block image when performing inter-frame coding by a block image of a partitioned macroblock image; a first encoding determination process for judging the existence of a block image having visually noticeable noise from the comparison of flatness and quantization error detected by the detection process when the estimated quantization error by the error estimation process is less than a predetermined value and selecting intra-frame coding if an applicable block image exists; and a second encoding determination process for judging the existence of a block image having visually noticeable noise from an estimated quantization error when the estimated quantization error by the error estimation process is greater than a predetermined value and selecting intra-frame coding if an applicable block image exists.

In accordance with a twelfth aspect of the present invention, there is provided a motion picture encoding processing program which selects either intra-frame coding or inter-frame coding and performs video compression, wherein the motion picture encoding processing program executes encoding determination processing by a processor, comprising the steps of: error estimation process for estimating the magnitude of quantization error of an entire macroblock image to encode using an assessment value obtained by a motion vector search at the time of inter-frame prediction; a first encoding determination process for detecting flatness and quantization error for each block image when performing inter-frame coding by a block image of a partitioned macroblock image, judging the existence of a block image having visually noticeable noise from the comparison of detected flatness and quantization error when the estimated quantization error by the error estimation process is less than a predetermined value and selecting intra-frame coding if an applicable block image exists; and a second encoding determination process for judging the existence of a block image having visually noticeable noise from the estimated quantization error when the estimated quantization error by the error estimation process is greater than a predetermined value and selecting intra-frame coding if an applicable block image exists.

In accordance with a thirteenth aspect of the present invention, there is provided a motion picture encoding processing program which selects either intra-frame coding or inter-frame coding and performs video compression, wherein the motion picture encoding processing program executes encoding determination processing by a processor, comprising the steps of: an error estimation process for estimating the magnitude of quantization error of an entire macroblock image to encode using an assessment value obtained by a motion vector search at the time of inter-frame prediction; a first encoding determination process for calculating flatness of an entire macroblock image and judging the flatness as to whether or not there is visually noticeable noise when the estimated quantization error by the error estimation process is less than a predetermined value, wherein if there is no visually noticeable noise selects inter-frame coding and conversely, if there is visually noticeable noise selects intra-frame coding; and a second encoding determination process for judging whether or not visually noticeable noise exists in a macroblock image from an estimated quantization error when the estimated quantization error by the error estimation process is greater than a predetermined value, wherein if there is no visually noticeable noise selects inter-frame coding and conversely, if there is visually noticeable noise selects intra-frame coding.

In accordance with a fourteenth aspect of the present invention, the second encoding determination process judges existence of a block image having visually noticeable noise while considering the magnitude of a motion vector obtained by inter-frame prediction.

In accordance with a fifteenth aspect of the present invention, an assessment value obtained by a motion vector search at the time of the inter-frame prediction is the Sum of Absolute Differences when detecting a motion vector with the highest correlation.

In accordance with a sixteenth aspect of the present invention, there is provided a motion picture encoding processing program which selects either intra-frame coding or inter-frame coding and performs video compression, wherein the motion picture encoding processing program executes encoding determination processing by a processor, comprising the steps of: a detection process for detecting the magnitude of quantization error of an entire macroblock image, as well as flatness and quantization error for each block image when performing inter-frame coding by a block image of a partitioned macroblock image; a first encoding determination process for judging the existence of a block image having visually noticeable noise from the comparison of detected flatness and quantization error when the quantization error of an entire macroblock image detected by the detection process is less than a predetermined value and selecting intra-frame coding if an applicable block image exists; and a second encoding determination process for judging the existence of a block image having visually noticeable noise while considering the magnitude of a motion vector obtained by inter-frame prediction when a quantization error of the entire macroblock image detected by the detection process is greater than a predetermined value and selecting intra-frame coding if an applicable block image exists.

According to the first and ninth aspects of the present invention, when performing inter-frame coding by a block image of a partitioned macroblock image to encode intra-frame coding is selected if a block image has visually noticeable noise. Conventionally, although the frequency of usage is low, the immense number of calculations in intra-prediction processing (refer to FIG. 14) which are executed for coding determination can be omitted, whereby wasteful calculations will not be performed and coding modes can be determined at a faster speed in view of human visual characteristics.

Also, because intra-frame coding is immediately selected if there is visually noticeable noise, quantization error propagation when 'trapped' in a local minimum can be rapidly stopped to avoid reduction in image quality.

According to the second and tenth aspects of the present invention, when performing inter-frame coding by a block image of a partitioned macroblock image to encode intra-frame coding is selected if a block image has visually noticeable noise and intra-frame coding is selected if a block image has visually noticeable noise while considering the magnitude of a motion vector obtained by inter-frame prediction. Conventionally, although the frequency of usage is low, the excessive number of calculations in intra-prediction processing (refer to FIG. 14) which are performed for coding determination can be omitted, whereby wasteful calculations will not be performed and coding modes can be determined at a faster speed in view of human visual characteristics.

Also, because intra-frame coding is immediately selected if there is visually noticeable noise, quantization error propagation when 'trapped' in a local minimum can be rapidly stopped to avoid reduction in image quality.

According to the third and eleventh aspects of the present invention, the magnitude of quantization error of the entire macroblock image to encode is estimated using the assessment value obtained by a motion vector search at the time of inter-frame prediction, and flatness and quantization error for each block image are detected when performing inter-frame coding for a block image of a partitioned macroblock image. Then, existence of a block image having visually noticeable noise is judged from the detected comparison of flatness and quantization error when the estimated quantization error is less than a predetermined value and intra-frame coding is selected if an applicable block image exists.

Meanwhile, existence of a block image having visually noticeable noise is judged from an estimated quantization error when the estimated quantization error is greater than a predetermined value and intra-frame coding is selected if an applicable block image exists.

Accordingly, even though the frequency of usage has been low in the past, the excessive number of calculations in intra-prediction processing (refer to FIG. 14) which are performed for coding determination can be omitted, whereby wasteful calculations will not be performed and coding modes can be determined at a faster speed in view of human visual characteristics.

Also, because intra-frame coding is immediately selected if there is visually noticeable noise, quantization error propagation when 'trapped' in a local minimum can be rapidly stopped to avoid reduction in image quality.

According to the fourth and twelfth aspects of the present invention, the magnitude of quantization error of the entire macroblock image to encode is estimated using the assessment value obtained by a motion vector search at the time of inter-frame prediction, as well as flatness and quantization error for each block image are detected when performing inter-frame coding for a block image of a partitioned macroblock image. Then, existence of a block image having visually noticeable noise is judged from the comparison of detected flatness and quantization error when the estimated quantization error is less than a predetermined value and intra-frame coding is selected if an applicable block image exists.

Meanwhile, existence of a block image having visually noticeable noise is judged from an estimated quantization error when the estimated quantization error is greater than a predetermined value and intra-frame coding is selected if an applicable block image exists.

Accordingly, even though the frequency of usage has been low in the past, the excessive number of calculations in intra-prediction processing (refer to FIG. 14) which are performed for coding determination can be omitted, whereby wasteful calculations will not be performed and coding modes can be determined at a faster speed in view of human visual characteristics.

Also, because intra-frame coding is immediately selected if there is visually noticeable noise, quantization error propagation when 'trapped' in a local minimum can be rapidly stopped to avoid reduction in image quality.

According to the fifth and thirteenth aspects of the present invention, the magnitude of quantization error of the entire macroblock image to encode is estimated using the assessment value obtained by a motion vector search at the time of inter-frame prediction, flatness is calculated for an entire macroblock image and the flatness is judged as to whether or not there is visually noticeable noise when the estimated quantization error is less than a predetermined value, wherein if there is no visually noticeable noise selects inter-frame coding and conversely, if there is visually noticeable noise selects intra-frame coding.

Meanwhile, visually noticeable noise is judged as to whether or not present in the macroblock image from the estimated quantization error when the estimated quantization error is greater than a predetermined value, wherein if there is no visually noticeable noise selects inter-frame coding and conversely, if there is visually noticeable noise selects intra-frame coding.

Accordingly, even though the frequency of usage has been low in the past, the excessive number of calculations in intra-prediction processing (refer to FIG. 14) which are performed for coding determination can be omitted, whereby wasteful calculations will not be performed and coding modes can be determined at a faster speed in view of human visual characteristics.

Also, because intra-frame coding is immediately selected if there is visually noticeable noise, quantization error propagation when 'trapped' in a local minimum can be rapidly stopped to avoid reduction in image quality.

According to the seventh and fifteenth aspects of the present invention, as the assessment value obtained by a motion vector search at the time of the inter-frame prediction, the Sum of Absolute Differences is used when detecting a motion vector with the highest correlation. As a result, because the magnitude of quantization error of an entire macroblock image to encode is estimated, the operations which calculate the quantization error of an entire macroblock image can be omitted.

According to the eighth and sixteenth aspects of the present invention, the magnitude of quantization error of the entire macroblock image is detected, as well as flatness and quantization error for each block are detected when performing inter-frame coding by a block image of a partitioned macroblock image. Then, existence of a block image having visually noticeable noise is judged from the comparison of detected flatness and quantization error when the quantization error is less than a predetermined value and intra-frame coding is selected if an applicable block image exists.

Meanwhile, existence of a block image having visually noticeable noise is judged while considering the magnitude of a motion vector obtained by inter-frame prediction when the quantization error of the entire macroblock image detected by the detection means is greater than a predetermined value and selecting intra-frame coding if an applicable block image exists.

Accordingly, even though the frequency of usage has been low in the past, the excessive number of calculations in intra-prediction processing (refer to FIG. 14) which are performed for coding determination can be omitted, whereby wasteful calculations will not be performed and coding modes can be determined at a faster speed in view of human visual characteristics.

Also, because intra-frame coding is immediately selected if there is visually noticeable noise, quantization error propagation when 'trapped' in a local minimum can be rapidly stopped to avoid reduction in image quality.

Human visual characteristics are categorized into a spatial visual sense characteristic and a temporal visual sense characteristic in relation to space and time, respectively. As for the spatial visual characteristic, it is known that sensitivity relative to gradation is higher than for resolution in flat portions of an image and conversely, sensitivity relative to resolution is higher than for gradation in a non-flat portions. Accordingly, when video is regarded as a sequence of still images, it is necessary to take into consideration the spatial visual sense characteristic.

Incidentally, since a quantization error is produced when encoding and added to a prediction image after inverse DCT is performed, the quantization error will ultimately remain in each pixel of the decoded image obtained by adding a decoding differential signal to the prediction image. When the difference value for each pixel produced in the process of encoding and decoding is added to each block, this reflects the amount of noise generated in these blocks.

As mentioned above, sensitivity of gradation is higher than for resolution in flat portions of an image. When the amount of noise is compared with commensurate blocks, the noise becomes visually noticeable to the extent that flatness of the image is higher. Specifically, although the noise in flat portions, such as, "human skin", "sky", "ground surface", etc. is noticeable, noise in flat portions, such as "audience seating", "forest", etc. is not noticeable. Accordingly, it is possible to estimate whether or not there is visually noticeable noise generated in a block by detecting the amount of noise and flatness in each block.

Based on such knowledge, the present invention judges whether or not visually noticeable noise exists in the current macroblock to encode and intra-frame coding is performed only if visually noticeable noise exists. In this manner, wasteful calculations will not be performed and coding modes can be determined at a faster speed in view of human visual characteristics. Moreover, as described later, quantization error propagation when 'trapped' in a local minimum can be rapidly stopped to avoid reduction in image quality.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, the preferred embodiments of the present invention will be described in detail with reference to the drawings.

A. First Preferred Embodiment

A-1. Configuration

Figure 1:
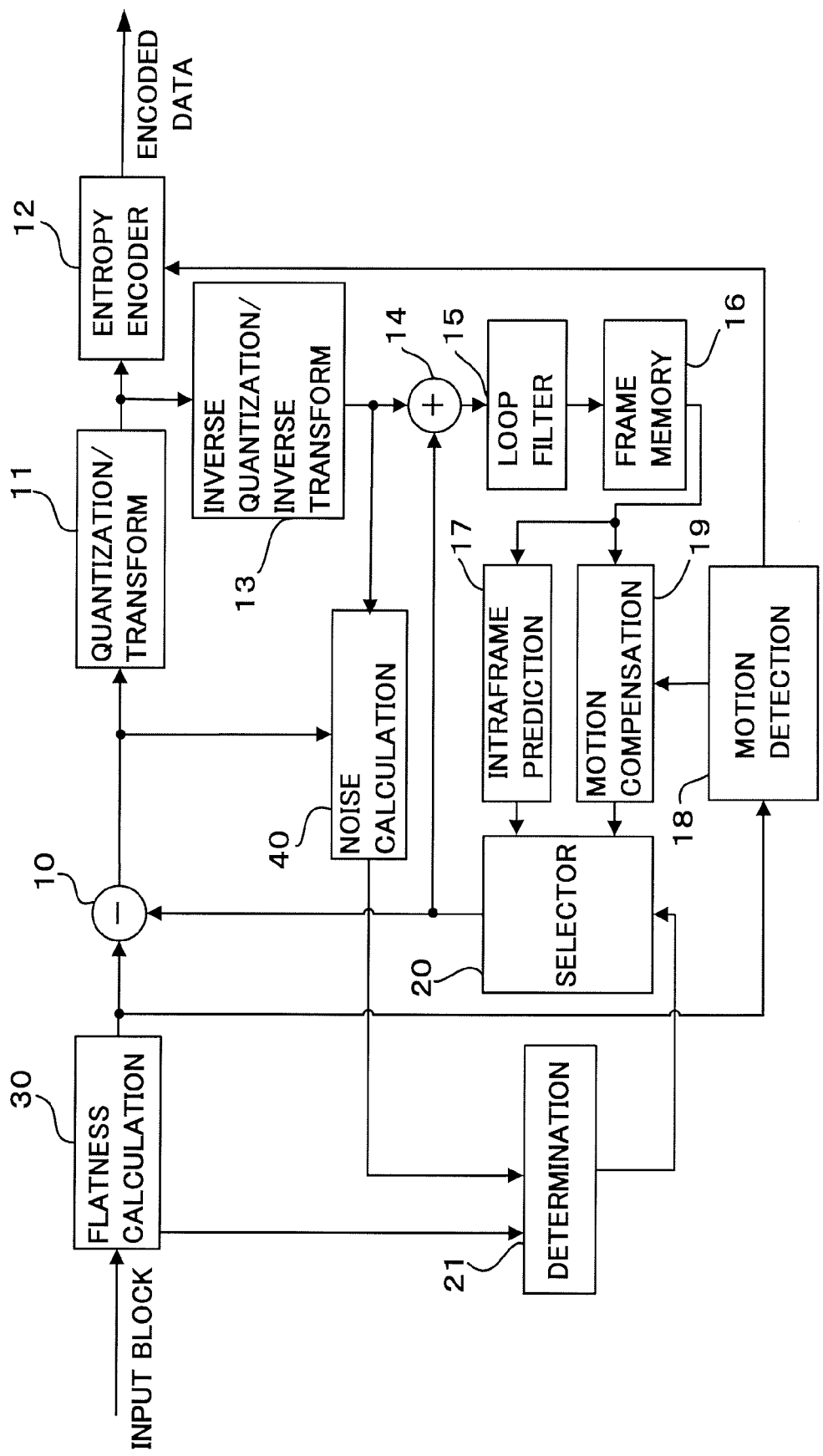
FIG. 1 is a block diagram showing the configuration of the first preferred embodiment of the present invention.

FIG. 1 is a block diagram showing the outline configuration of a motion picture encoding device according to the first preferred embodiment. In the motion picture encoding device of FIG. 1, the same nomenclature is appended to the constituent elements which are common in the conventional prior art example shown in FIG. 9 and explanation is omitted.

Figure 9:
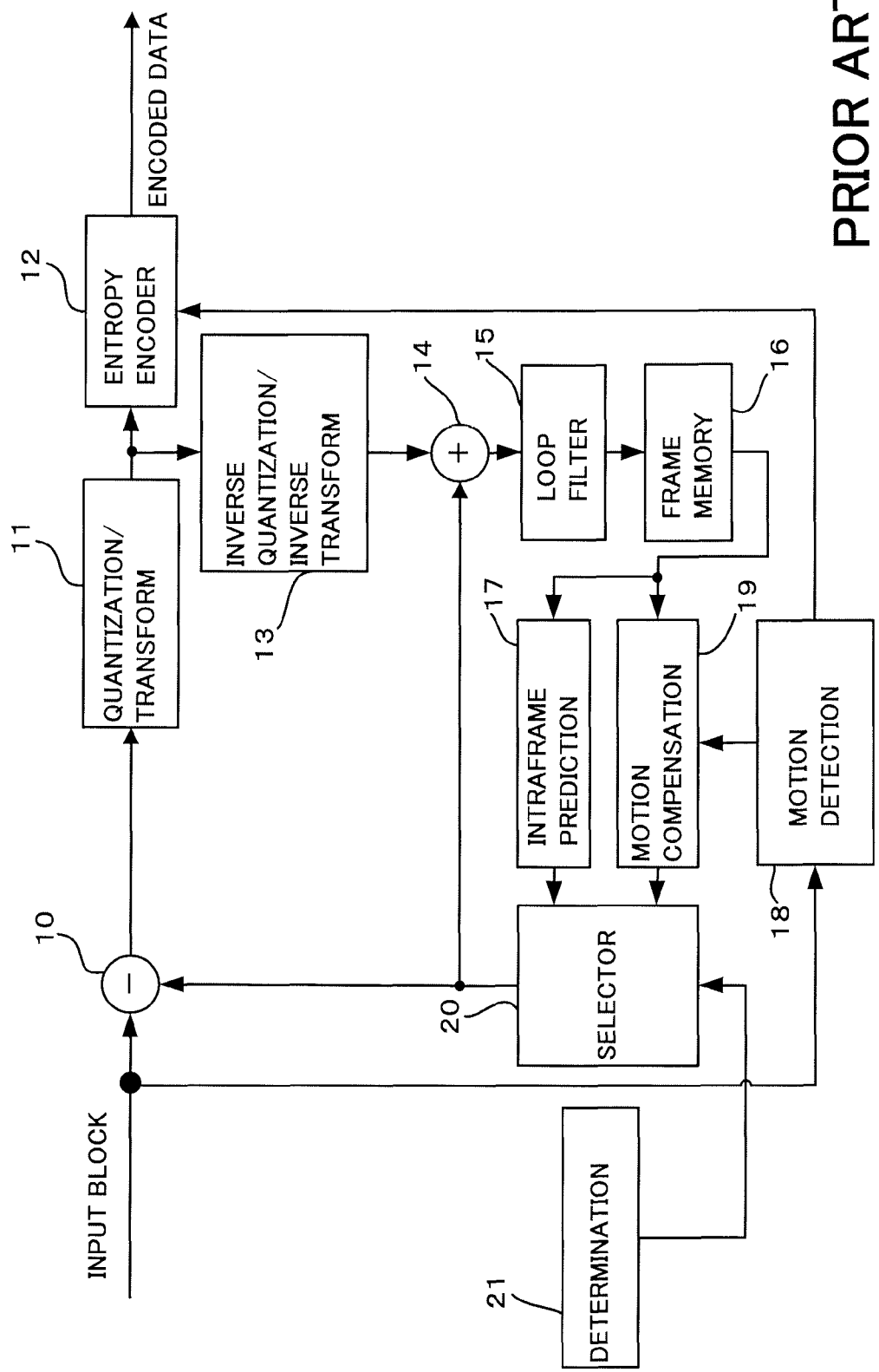
FIG. 9 is a block diagram showing the configuration of a motion picture encoding device of a conventional prior art example.
Figure 10:
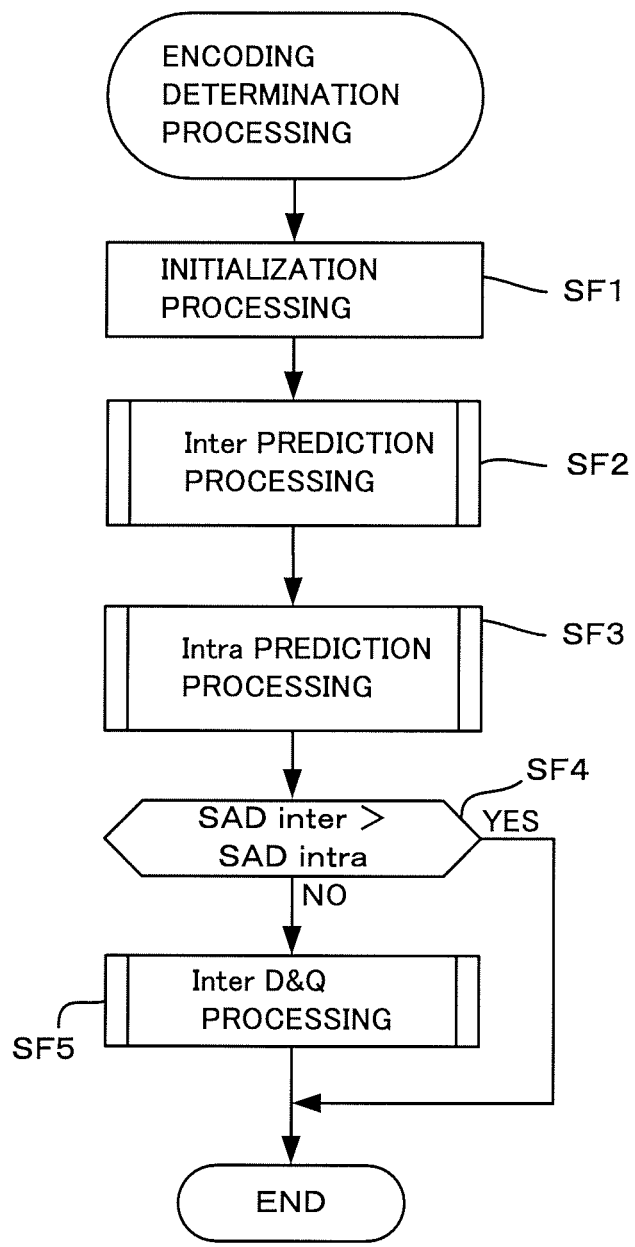
FIG. 10 is a flow chart showing operations of the encoding determination processing of a conventional prior art example.

The differences between the motion picture encoding device shown in FIG. 1 and the conventional prior art example in FIG. 9 are that a flatness calculation section 30 and a noise calculation section 40 are newly provided, and the determination section 21 selects either intra-frame coding or inter-frame coding according to each output of the flatness calculation section 30 and the noise calculation section 40.

The flatness calculation section 30 calculates flatness by applying the well-known Hadamard transform (also known as Walsh-Hadamard transform) to the macroblock image (the current macroblock) inputted as a coding object. Specifically, the sum absolute value of the harmonic content coefficient of a Hadamard coefficient is obtained by performing Hadamard transform on each of the 4×4 pixel blocks of a 16×16 pixel current macroblock partitioned into 16 sub-macroblocks to calculate the flatness for each block as Flat(0)~Flat (15). Furthermore, the current macroblock flatness Flat is obtained from the sum total for each of these blocks Flat(0)~Flat (15).

In addition, flatness Flat is calculated by 4×4 pixel blocks based on the following three reasons:

1) There are predominantly a lesser number of calculations in the way of performing Hadamard transform 16 times for 4×4 pixel blocks rather than for performing Hadamard transform for a 16×16 pixel macroblock.

2) As for 4×4 pixel Hadamard transform, sufficient resolution can be obtained in the flatness assessment that the present invention intends although square wave resolution drops to ¼ as compared with 16×16 Hadamard transform.

3) Since integer DCT is used for 4×4 pixel sub-blocks in orthogonal transform of the H.264 standard, the calculation buffer which temporarily stores the sub-block pixel values can also be shared for use in flatness calculation.

The noise calculation section 40 extracts a quantization error relative to overlapping pixel values and generates noise Noise(0)~(15) for each block. The quantization error for each pixel is calculated from difference value An (i,j) of the current block pixel value Org (i,j) and the reference image (motion compensated locally decoded image) pixel value ref (i,j), and from difference Zn (i,j) with difference value A'n (i,j) after these are locally decoded. The sum absolute value difference Zn (i,j) becomes noise Noise(0)~(15) for each 4×4 pixel block.

In the determination section 21, an error status determination is performed using a minimum Sum of Absolute Differences minSAD (hereinafter, denoted as "minSAD value") obtained by the motion vector search at the time of inter-prediction as a substitute for the quantization error total amount Σ Noise (noise Noise(0)~(15) sum total). A first and second coding determination is performed corresponding to the result of this error status determination.

The error status determination judges whether or not the minSAD value of the current macroblock as the coding object is greater than a threshold value TH1 (described later). When the minSAD value is less than the threshold value TH1 (referred to as "lower" below) according to this error status determination, a first coding determination (described later) is performed. Conversely, when the minSAD is greater than the threshold value TH1 (referred to as "higher" below), a second coding determination (described later) is performed.

Figure 2:
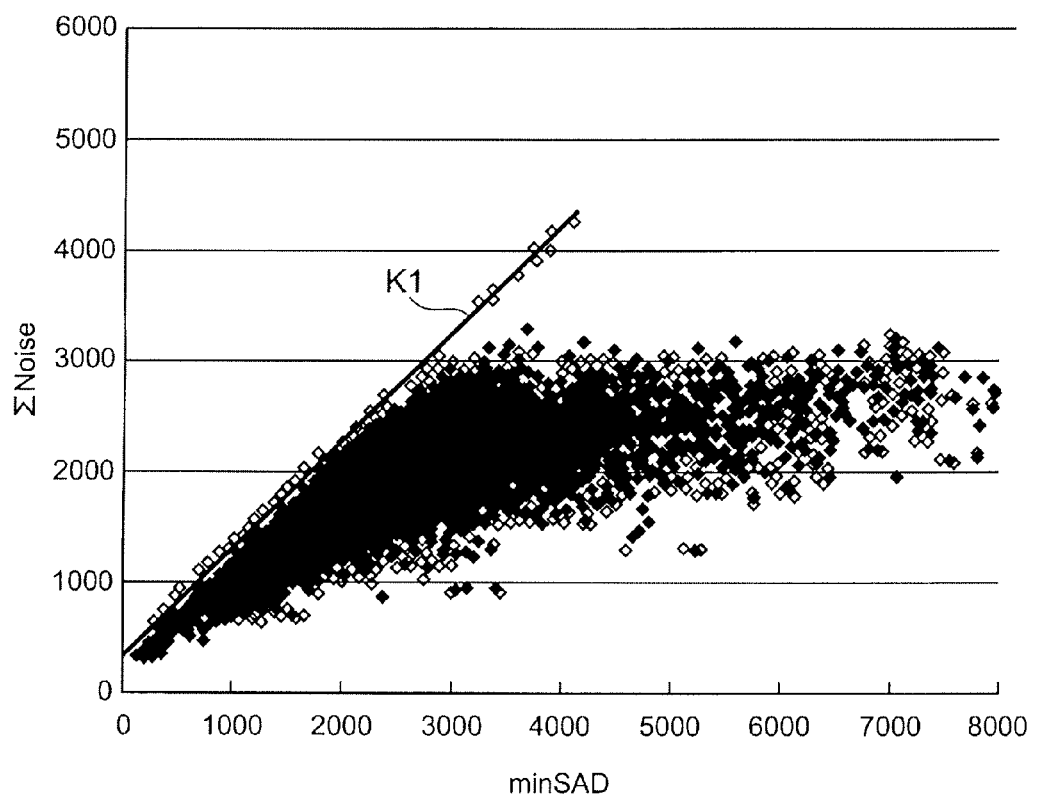
FIG. 2 is a graph for illustrating the corresponding comparison between the minSAD value (x-axis) of an ordinary image, for example, a broadcast image, and the quantization error total amount $\Sigma$ Noise (y-axis)

The quantization error total amount Σ Noise will be explained with reference to FIG. 2 concerning the reason for which the minSAD value can be substituted. FIG. 2 is a graph for illustrating the comparison between the minSAD value (x-axis) and the quantization error total amount Σ Noise (y-axis) obtained in a 16×16 pixel macroblock of an ordinary image, such as a broadcast image, etc.

As shown in this graph, the minSAD value acquires the value which invariably exceeds the quantization error total amount Σ Noise bordering on the linear function K1. Therefore, even when the minSAD value is substituted for the quantization error total amount Σ Noise, there is no possibility of overlooking an actual quantization error and proves that a general error difference determination can be sufficiently tolerated. Moreover, an increase in the number of calculations is also avoidable by substituting the minSAD value for the quantization error total amount Σ Noise.

However, even when the quantization error (minSAD value) is judged to be lower by the error status determination of the determination section 21, visually noticeable noise exists in some pixels of the macroblock and the possibility remains that this may be the result of a quantization error with other pixels in an equally lower positions.

Therefore, in the determination section 21, a first coding determination is performed which takes into consideration both noise "Noise" and flatness "Flat" extracted by a 4×4 pixel block of a macroblock partitioned into 16 sub-macroblocks. Although these details will be described later, in the first coding determination, the existence of visually noticeable noise is judged from noise "Noise" and flatness "Flat", and intra-frame coding is selected if visually noticeable noise exists.

On the other hand, when the quantization error (minSAD value) is judged to be higher by the error status determination, the quantization error may have been generated not only in some of the pixels but in the entire macroblock. Therefore, in the determination section 21, a second coding determination is performed is performed which takes into consideration the "minSAD value", flatness "Flat" and motion vector by a 16×16 pixel macroblock.

Figure 3:
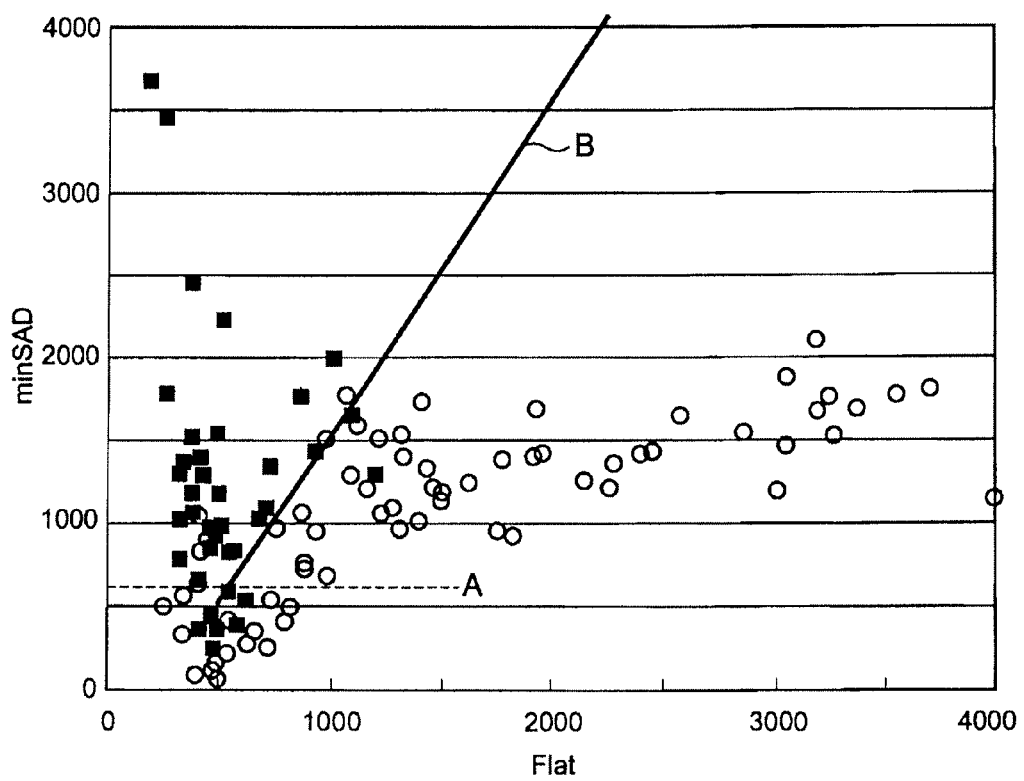
FIG. 3 is a plotted graph showing macroblock flatness Flat/minSAD values with visually noticeable noise and macroblock flatness Flat/minSAD values without visually noticeable noise.

Here, an outline of the second coding determination will be explained with reference to FIG. 3. FIG. 3 is a plotted graph showing the flatness Flat and the minSAD value of macroblocks (black squares in graph) with visually noticeable noise and the flatness Flat and the minSAD value of macroblocks (white circles in graph) without visually noticeable noise, respectively.

The graph shows that in the area greater than the straight dashed line A drawn in the vicinity of minSAD="600", it is possible to discriminate whether or not there is visually noticeable noise in the extended area using a linear approximation function shown by the straight line B. In addition, the straight dashed line A value is equivalent to the threshold value TH1 used for the error status determination mentioned above.

Accordingly, the second coding determination judges whether or not the flatness Flat and the minSAD value of the current macroblock are in the upper side area of the straight line B (extended area with visually noticeable noise), and intra-frame coding is selected when in the upper side area of the straight line B.

Incidentally, in cases where the motion vector is large due to movement of an object, camera pan, etc., the current macroblock becomes a blurred image and the quantization error indicates no visually noticeable noise. Nevertheless, there is a tendency for the minSAD value to become higher.

Consequently, the second coding determination judges whether or not to perform intra-frame coding based on the following formula [1] from the fact that there is a necessity to adaptively change the determination contents mentioned above in proportion to the motion vector (u, v) of the current macroblock (Note the symbol "x" denotes multiplication and has the same meaning as the symbol "*" (asterisk) also used for multiplication.)

$$\text{minSAD} > (1 + a \times f(mv)) \times k \times \text{Flat} \quad [1]$$

Additionally, in formula [1] the coefficient a is constant to adjust the contributive factor of the motion vector, and the coefficient k is constant equivalent to the inclination of the straight line B mentioned above. Function f (mv) is the magnitude $(u^2+v^2)$ of the current macroblock motion vector (u, v).

A-2. Operations

Next, the encoding determination operations of the first preferred embodiment according to the above-mentioned configuration will be explained with reference to FIG. 4~FIG. 5.

<Operations of the Encoding Determination Processing>

Figure 4:
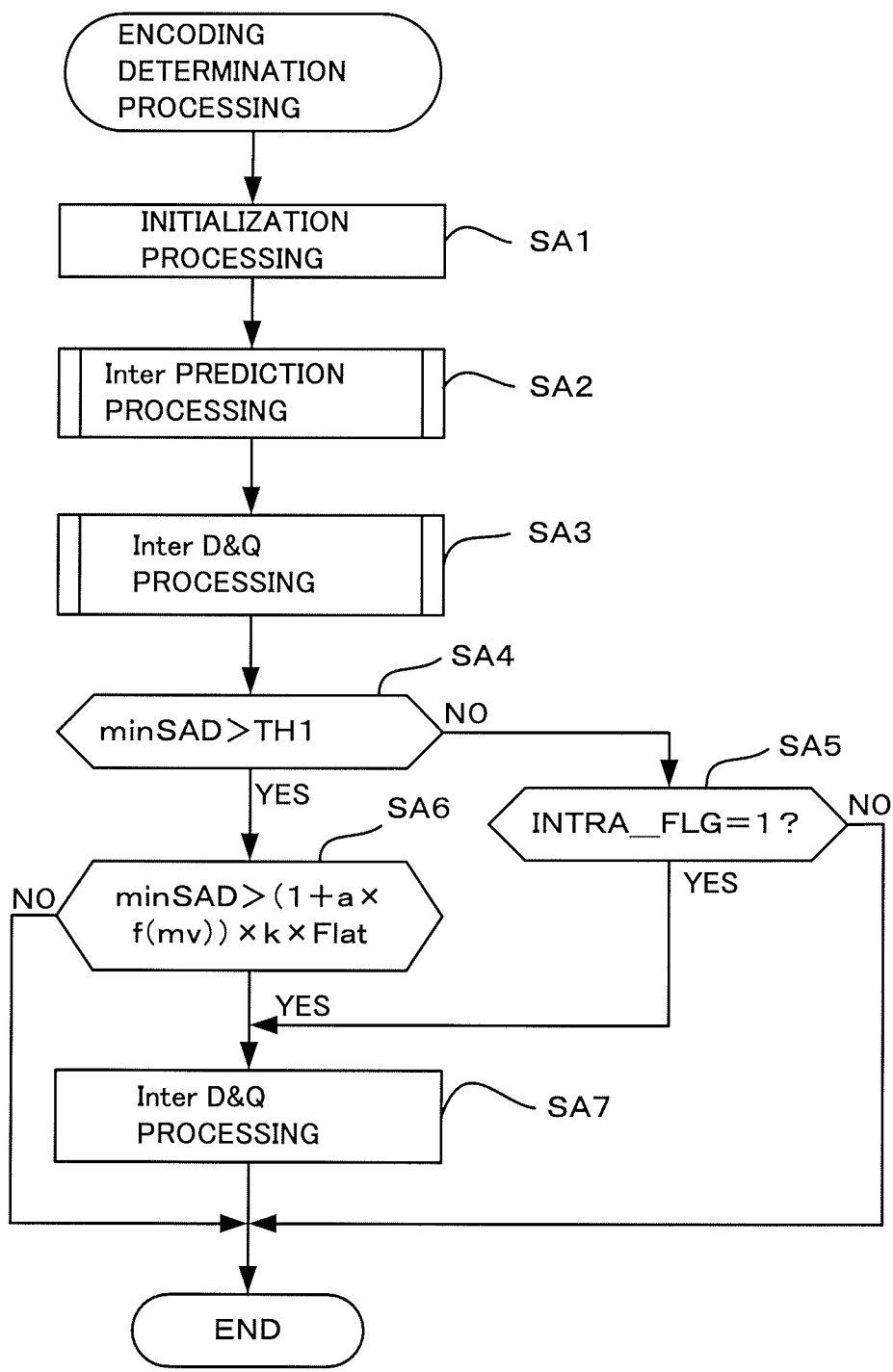
FIG. 4 is a flow chart showing operations of the encoding determination processing according to the first preferred embodiment.
Figure 5:
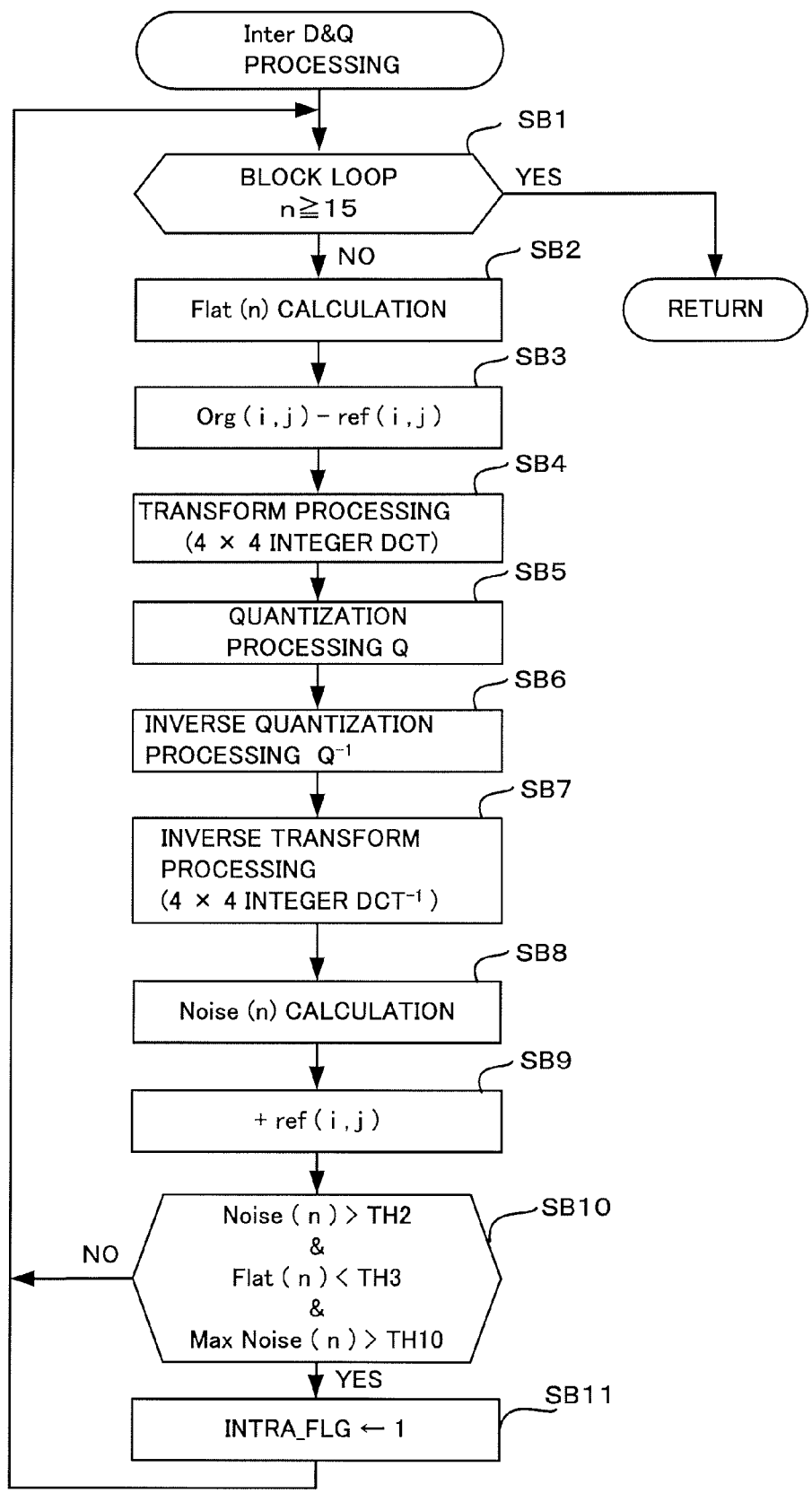
FIG. 5 is a flow chart showing operations of the inter D&Q processing according to the first preferred embodiment.
Figure 11:
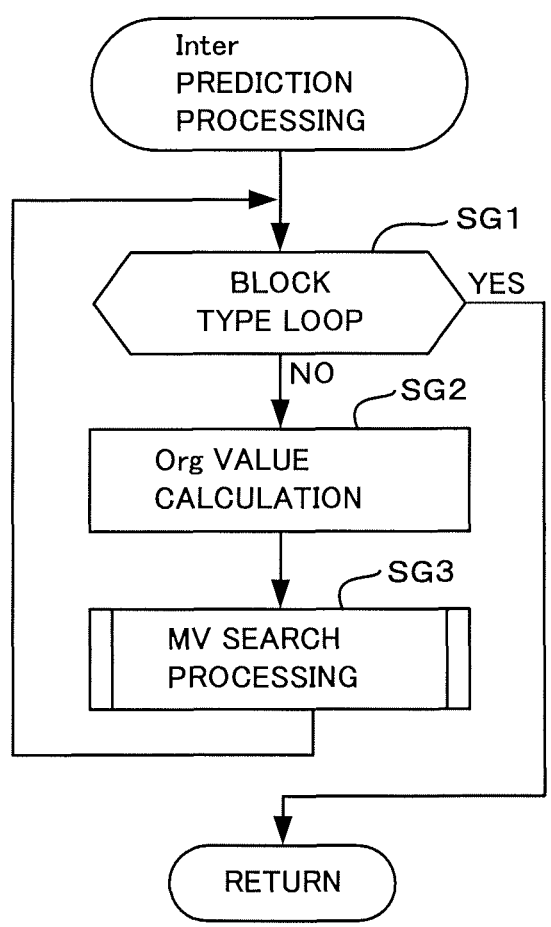
FIG. 11 is a flow chart showing operations of the inter-prediction processing of a conventional prior art example.
Figure 12:
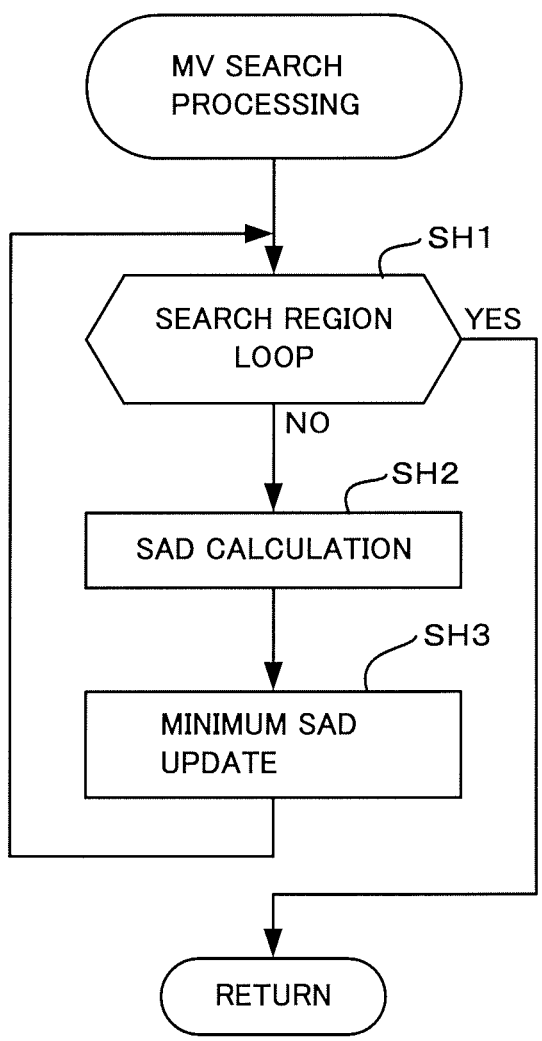
FIG. 12 is a flow chart showing operations of the MV search processing of a conventional prior art example.
Figure 13:
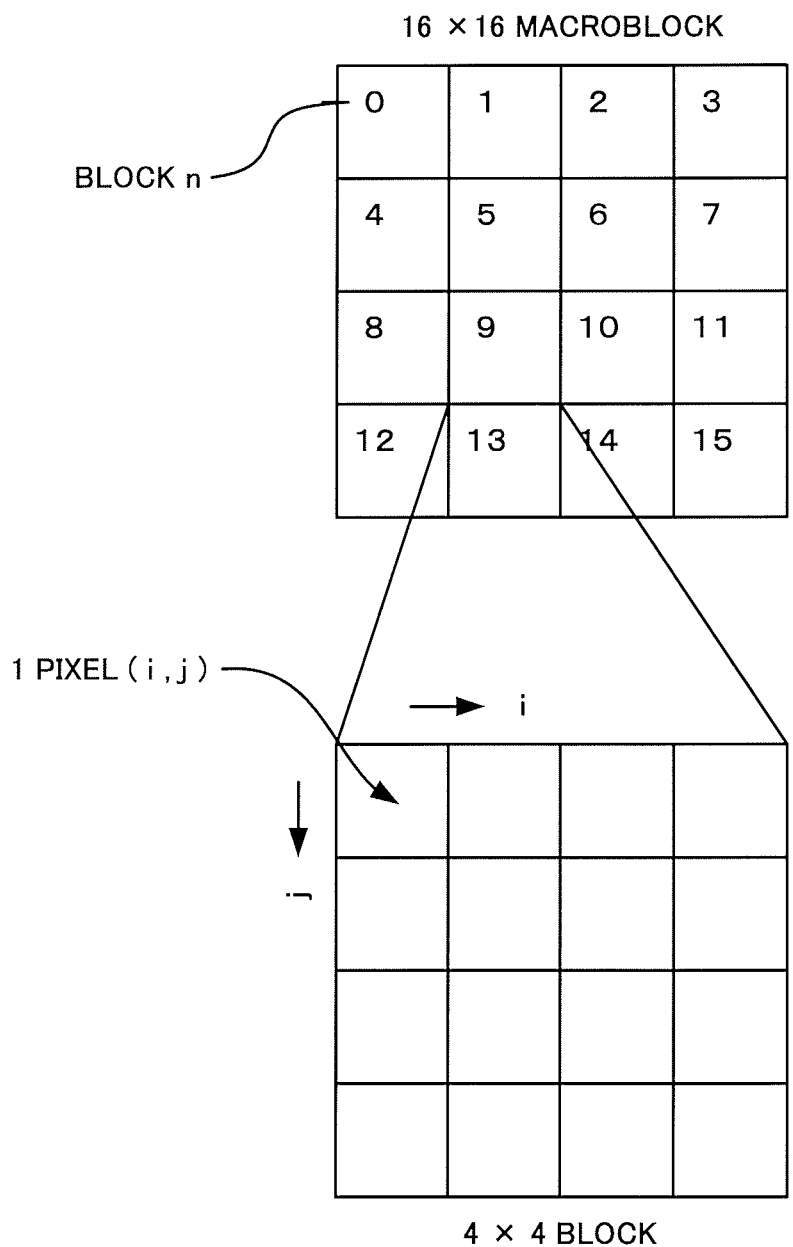
FIG. 13 is a diagram showing the association between a 16×16 pixel macroblock and a 4×4 pixel block.

FIG. 4 is a flow chart showing operations of the encoding determination processing executed for each input macroblock. When processing is performed corresponding to an input macroblock, after initializing each section of the device in Step SA1, the flow advances to Step SA2 and inter-prediction processing to estimate the amount of coded data at the time of inter-frame predictive coding is executed. This inter-prediction processing is same as that of the conventional prior art example shown in FIG. 11. MV search processing is performed to search for a motion vector among all of the 4×4 pixel blocks of the 16×16 pixel current macroblock partitioned into 16 sub-macroblocks and the minSAD value for each block is obtained.

Subsequently, in Step SA3, inter D&Q processing to perform inter-frame coding (integer DCT, quantization, inverse quantization and inverse integer DCT) is executed. Next, in Step SA4, whether or not the minSAD value obtained in the inter-prediction processing of the above-mentioned Step SA2 exceeds the threshold value TH1 is judged. Accordingly, the above-mentioned error status determination is executed.

When the quantization error in the error status determination is judged to be lower, the judgment result becomes "NO" and the flow advances to Step SA5. In Step SA5, whether or not a flag INTRA_FLG (described later) has been set to "1" is judged. The flag INTRA_FLG is a flag generated by inter D&Q processing (described later), which is set to "1" if visually noticeable noise exists in the current macroblock. Accordingly, this Step SA5 is equivalent to the first coding determination mentioned above.

Because of the flag INTRA_FLG being set to "1" if visually noticeable noise exists in the current macroblock, the judgment result of Step SA5 becomes "YES". The flow advances to Step SA7 and intra D&Q processing to perform intra-frame coding is executed. Meanwhile, if visually noticeable noise does not exist in the current macroblock, the flag INTRA_FLG will not be set to "1". The judgment result of Step SA5 becomes "NO" and this processing is completed.

Conversely, in the error status determination of the above-mentioned Step SA4, when the quantization error is judged to be higher, the judgment result becomes "YES" and the flow advances to Step SA6. In Step SA6, the second coding determination is performed based on the criterion expressed in formula [1] stated above. Namely, whether or not visually noticeable noise exists in the current macroblock is judged while considering the magnitude of the motion vector. If visually noticeable noise exists, the judgment result becomes "YES," the flow advances to Step SA7 and executes intra D&Q processing. Conversely, if visually noticeable noise does not exist, the judgment result becomes "NO" and this processing is completed.

<Operations of the Inter D&Q Processing>

Next, the operations of the inter D&Q processing will be explained with reference to FIG. 5. When this processing is executed via Step SA3 (refer to FIG. 4), the flow advances to Step SB1 shown in FIG. 5 and whether or not processing has been completed for all of the 4×4 pixel blocks of a 16×16 pixel current macroblock partitioned into 16 sub-macroblocks is judged. When processing has been completed for all the blocks, the judgment result becomes "YES" and this processing is completed. Otherwise, the judgment result becomes "NO" and the flow advances to Step SB2. In Step SB2, flatness Flat (n) of the current block is calculated from the sum absolute value of the harmonic content coefficient of a Hadamard coefficient obtained by Hadamard transform for each block.

Next, in Steps SB3~SB7, the inter-frame prediction block value ref (i, j) (reference image pixel value) is subtracted from the current block pixel value Org (i, j) and then transform processing (integer DCT), quantization processing Q, inverse quantization processing Q-1 and inverse transform processing (inverse integer $DCT^{-1}$) are applied to the generated prediction error signal (difference value An (i, j)). Subsequently, in Step SB8, the quantization error relative to overlapping pixel values is extracted from the above-mentioned difference value An (i, j), as well as the difference Zn (i, j) with the difference value A'n (i, j) after these are locally decoded. Further, the sum absolute value difference Zn (i, j) is calculated for the current block noise Noise (n). Also, in Step SB8, the quantization error maximum value max Noise (n) within the 4×4 pixels that constitute the current block is detected. Then, in Step SB9, stepping of the inter-frame prediction block value ref (i, j) is performed.

Next, in Step SB10, the above-mentioned first coding determination is executed for judging the existence of visually noticeable noise, namely, the current block noise Noise value (n) is greater than a threshold value TH2, the current block flatness Flat (n) is less than a threshold value TH3 and the quantization error maximum value max Noise (n) is less than a threshold value TH10.

If visually noticeable noise exists, the judgment result becomes "YES" and the flow advances to Step SB11. After setting the flag INTRA_FLG to "1", processing reverts to Step SB1. Conversely, when no visually noticeable noise exists, the judgment result becomes "NO" and processing reverts to Step SB1.

Thus, in this first preferred embodiment, the minSAD value obtained by the motion vector search at the time of inter-prediction is substituted as the assessment value which represents the quantization error total amount Σ Noise for the current macroblock made into a coding object. The error status determination roughly judges the magnitude of quantization error by whether or not this minSAD exceeds the threshold TH1. Subsequently, when the quantization error in this error status determination is deemed to be lower, whether or not there is visually noticeable noise in some pixels of the current macroblock is judged based on flatness Flat and noise Noise detected in each of the 4×4 pixel blocks of the current macroblock partitioned into 16 sub-macroblocks. If there is visually noticeable noise, intra-frame coding is selected. Meanwhile, when the quantization error in this error status determination is deemed to be higher, whether or not visually noticeable noise exists in the current macroblock is judged while considering the magnitude of the motion vector. If there is visually noticeable noise, intra-frame coding is selected.

Figure 14:
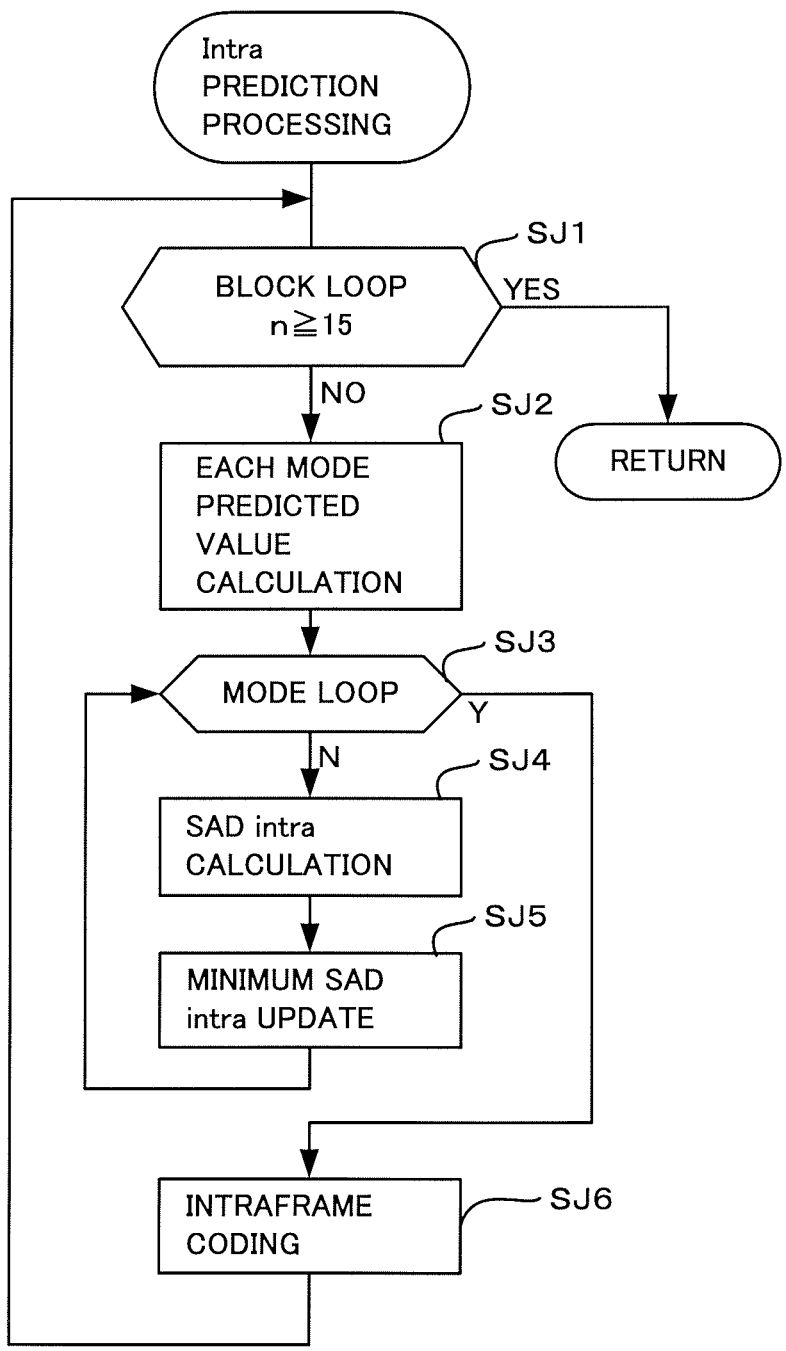
FIG. 14 is a flow chart showing operations of the intra-prediction processing of a conventional prior art example.

Accordingly, although the former frequency of usage is low, the immense number of calculations in intra-prediction processing (refer to FIG. 14) which are executed for coding determination can be omitted. As a result, wasteful calculations will not be performed and coding modes can be determined at a faster speed in view of human visual characteristics.

Also, because intra-frame coding is immediately selected when judged there is visually noticeable noise in the current macroblock based on flatness Flat and noise Noise, quantization error propagation when 'trapped' in a local minimum can be rapidly stopped to avoid reduction in image quality.

B. Second Preferred Embodiment

Figure 6:
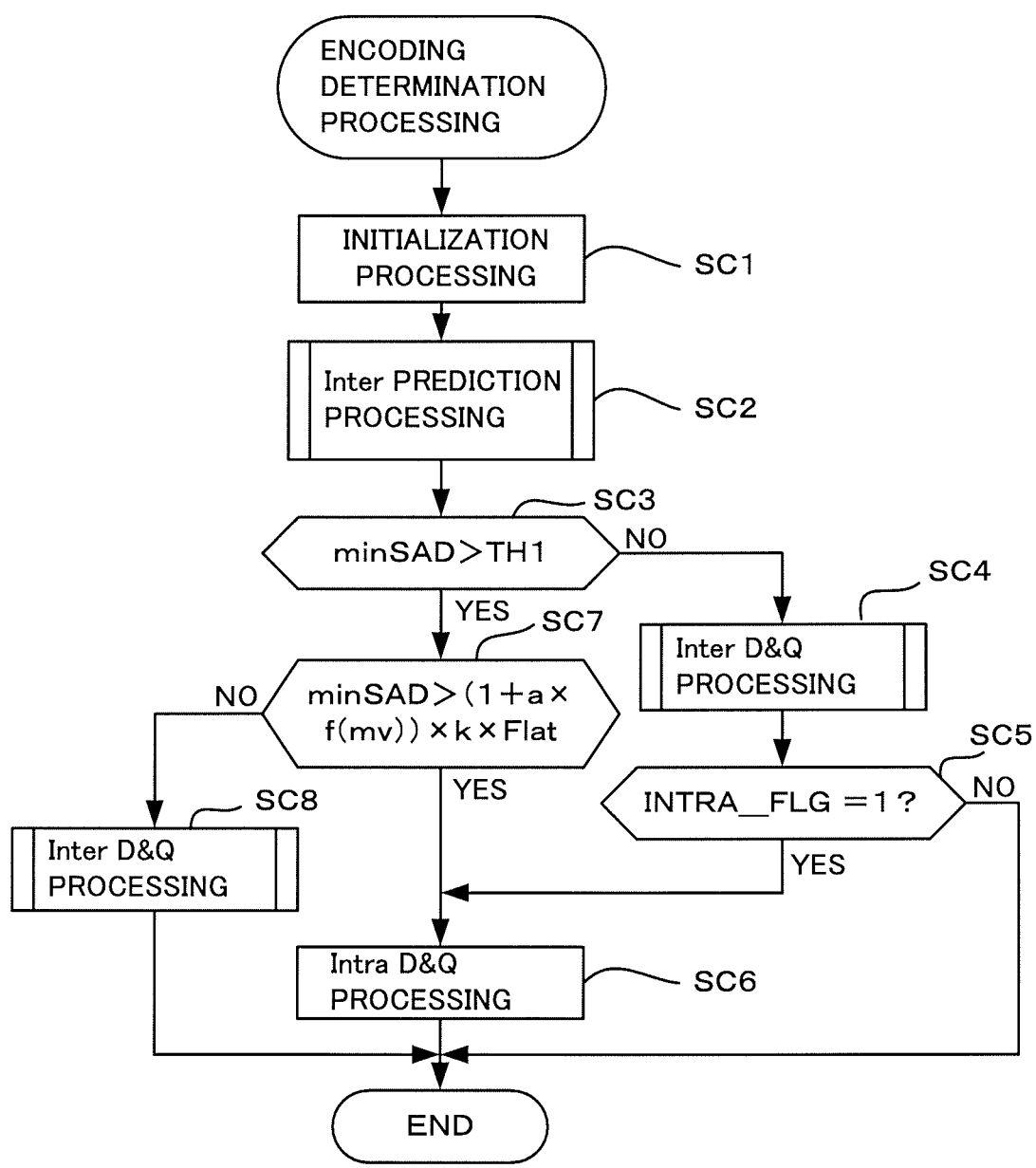
FIG. 6 is a flow chart showing operations of the encoding determination processing according to the second preferred embodiment.

Next, the operations of the encoding determination processing according to the second preferred embodiment will be explained with reference to FIG. 6. When processing is performed corresponding to an input macroblock similar to the above-mentioned first preferred embodiment and after initializing each section of the device in Step SC1, the flow advances to Step SC2 and inter-prediction processing to estimate the amount of coded data at the time of inter-frame prediction processing coding is executed. The minSAD for each of the 4×4 pixel blocks of the 16×16 pixel current macroblock partitioned into 16 sub-macroblocks is obtained.

Subsequently, in Step SC3, an error status determination is performed to judge whether or not the minSAD value obtained in the inter-prediction processing of the above-mentioned Step SC2 exceeds the threshold value TH1 and after all the quantization error is lower. When the quantization error is judged to be lower, the judgment result becomes "NO" and the flow advances to Step SC4. In Step SC4, while performing inter-frame coding, whether or not visually noticeable noise exists in some of the pixels of the current macroblock is judged based on flatness Flat and noise Noise detected in each of the 4×4 pixel blocks. If there is visually noticeable noise, inter D&Q processing (refer to FIG. 5) which sets the flag INTRA_FLG to "1" is executed.

In Step SC5, whether or not visually noticeable noise has been detected in the inter D&Q processing of the above-mentioned Step SC4 is judged, namely, whether or not the flag INTRA_FLG has been set to "1". If visually noticeable noise has been detected, the judgment result becomes "YES". The flow advances to Step SC6 and the intra D&Q processing to perform intra-frame coding is executed. Conversely, if visually noticeable noise has not been detected, the judgment result of Step SC5 becomes "NO" and this processing is completed.

Meanwhile, when the quantization error is judged to be higher, the judgment result of the above-mentioned Step SC3 becomes "YES" and the flow advances to Step SC7. In Step SC7, similar to the first preferred embodiment, whether or not visually noticeable noise exists in the current macroblock is judged while considering the magnitude of the motion vector based on the criterion expressed in above-mentioned formula [1]. If visually noticeable noise does not exist in the current macroblock, the judgment result becomes "NO" and the flow advances to Step SC8.

Figure 15:
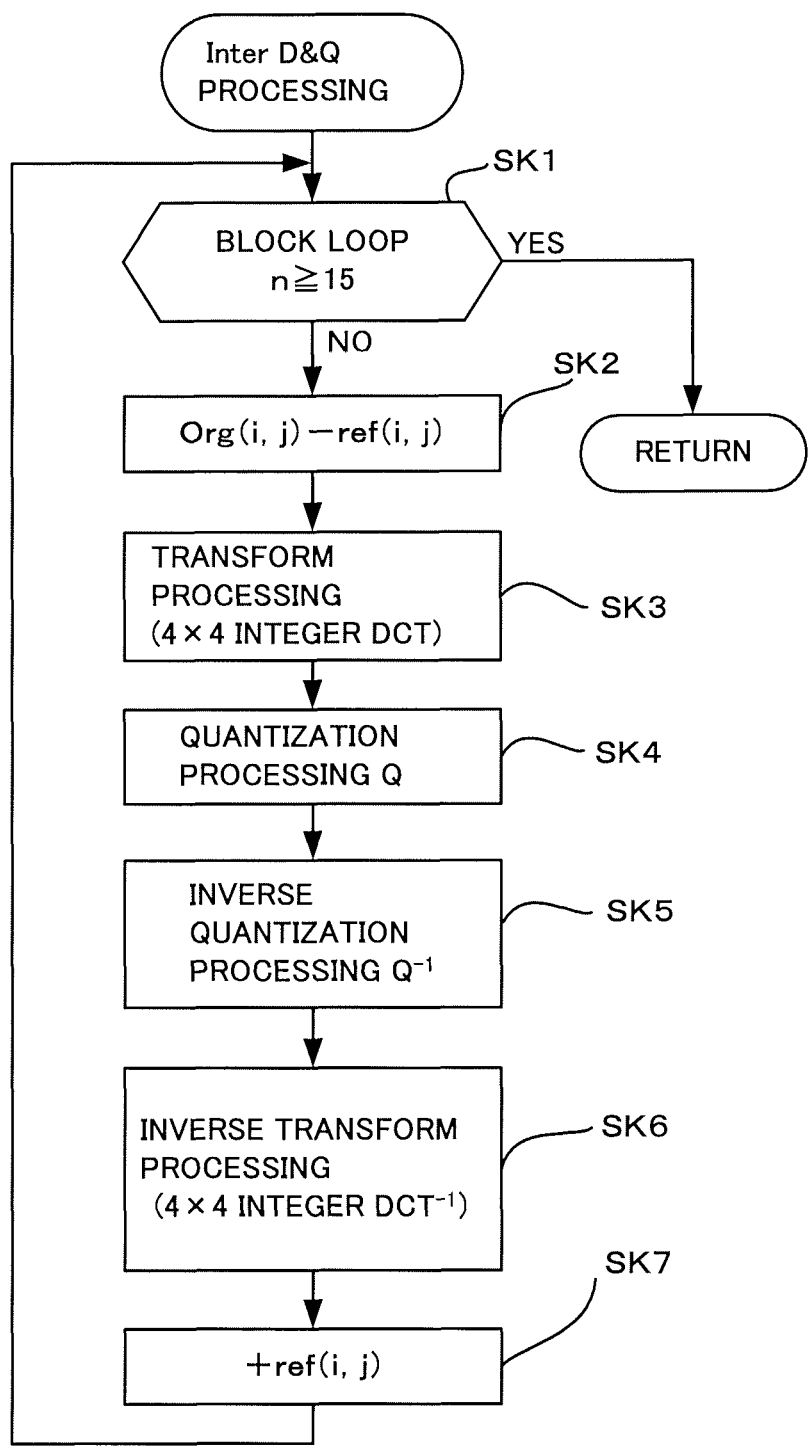
FIG. 15 is a flow chart showing operations of the inter D&Q processing of a conventional prior art example.

In Step SC8, inter D&Q processing (refer to FIG. 15) to perform inter-frame coding is executed. Meanwhile, if visually noticeable noise does exist in the current macroblock, the judgment result of the above-mentioned Step SC7 becomes "YES". The flow advances to Step SC6 and intra-frame D&Q processing is executed to perform intra-frame coding and this processing is completed.

Thus, in the second preferred embodiment, the minSAD value obtained by the motion vector search at the time of inter-prediction is substituted as the assessment value which represents the quantization error total amount Σ Noise for the current macroblock made into a coding object. The error status determination roughly judges the magnitude of quantization error by whether or not this minSAD exceeds the threshold TH1. Subsequently, when the quantization error in this error status determination is deemed to be lower, whether or not there is visually noticeable noise in some pixels of the current macroblock is judged based on flatness Flat and noise Noise detected in each of the 4×4 pixel blocks of the current macroblock partitioned into 16 sub-macroblocks. If there is visually noticeable noise, intra-frame coding is selected.

Meanwhile, when the quantization error in this error status determination is deemed to be higher, whether or not visually noticeable noise exists in the current macroblock is judged while considering the magnitude of the motion vector. If there is no visually noticeable noise, inter-frame coding is selected. Conversely, if there is visually noticeable noise, intra-frame coding is selected.

Accordingly, similar to the first preferred embodiment, the immense number of calculations in intra-prediction processing (refer to FIG. 14) which are executed for coding determination can be omitted. As a result, wasteful calculations will not be performed and coding modes can be determined at a faster speed in view of human visual characteristics. Also, because intra-frame coding is immediately selected when judged there is visually noticeable noise in the current macroblock based on flatness Flat and noise Noise, quantization error propagation when 'trapped' in a local minimum can be rapidly stopped to avoid reduction in image quality.

C. Third Preferred Embodiment

Figure 7:
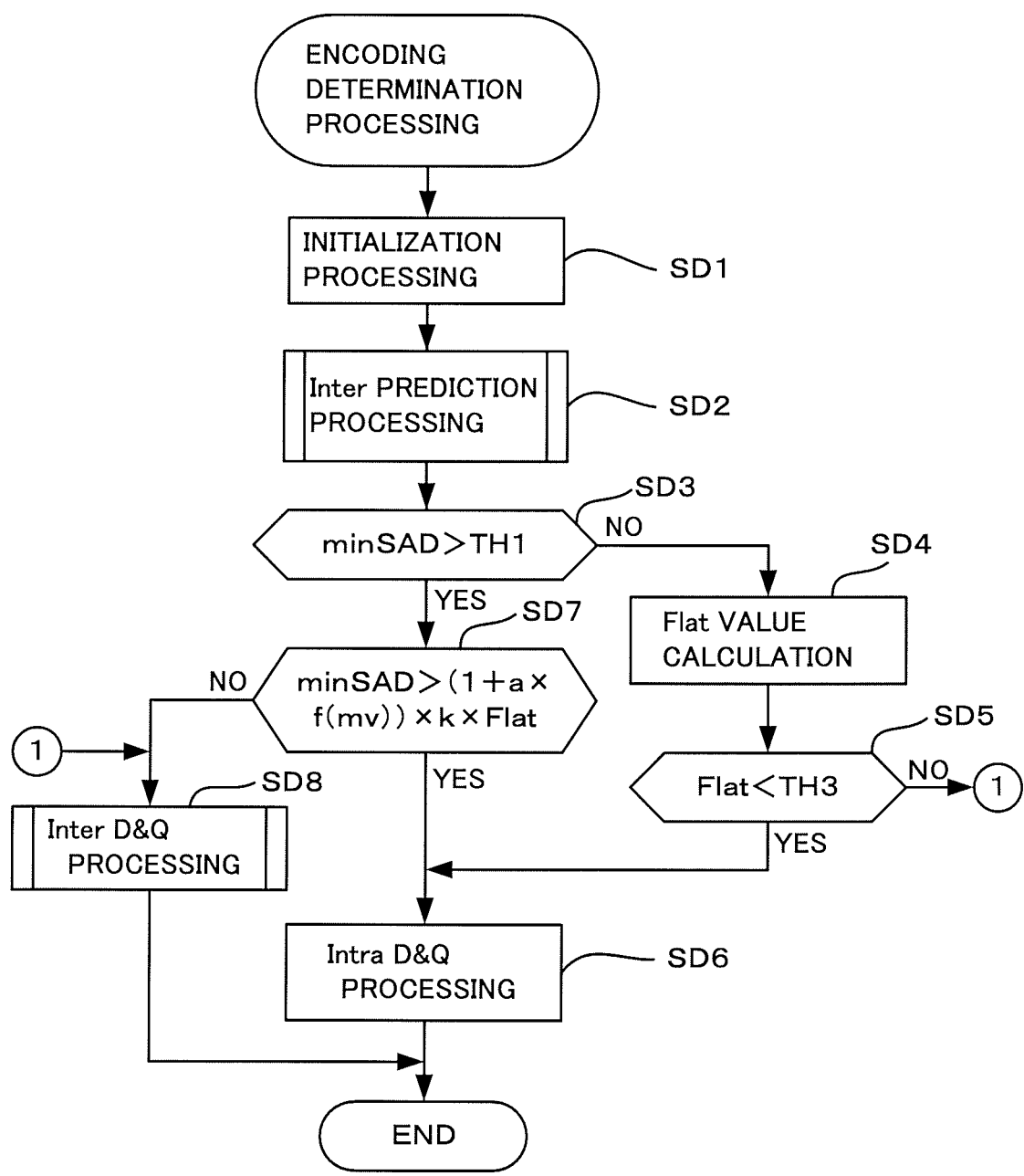
FIG. 7 is a flow chart showing operations of the encoding determination processing according to the third preferred embodiment.

Next, the operations of the encoding determination processing according to the third preferred embodiment will be explained with reference to FIG. 7. When processing is performed corresponding to an input macroblock similar to the above-mentioned first preferred embodiment and after initializing each section of the device in Step SD1, the flow advances to Step SD2 and inter-prediction processing to estimate the amount of coded data at the time of inter-frame prediction processing coding is executed. The minSAD for each of the 4×4 pixel blocks of the 16×16 pixel current macroblock partitioned into 16 sub-macroblocks is obtained. Subsequently, in Step SD3, an error status determination is performed to judge whether or not the minSAD value obtained in the inter-prediction processing of the above-mentioned Step SD2 exceeds the threshold value TH1, namely, the quantization error is lower.

When quantization error is judged to be lower by the error status determination, the judgment result becomes "NO" and the flow advances to Step SD4. In Step SD4, the current macroblock flatness Flat is calculated from the sum absolute value of the harmonic content coefficient of a Hadamard coefficient obtained by Hadamard transform for each 4×4 pixel block. Next, in Step SD5, whether or not the calculated flatness Flat is less than the threshold value TH3 is judged, namely, flatness in which there is visually noticeable noise.

If the flatness Flat has no visually noticeable noise, the judgment result becomes "NO" and the flow advances to Step SD8, which executes inter D&Q processing (refer to FIG. 15) to perform inter-frame coding (integer DCT, quantization, inverse quantization and inverse integer DCT). Conversely, if the flatness Flat has visually noticeable noise, the judgment result of the above-mentioned Step SD5 becomes "YES" and the flow advances to Step SD6 and executes intra D&Q processing to perform intra-frame coding.

Meanwhile, when the quantization error is judged to be higher, the judgment result of the above-mentioned Step SD3 becomes "YES" and the flow advances to Step SD7. In Step SD7, similar to the first preferred embodiment, whether or not visually noticeable noise exists in the current macroblock is judged while considering the magnitude of the motion vector based on the criterion expressed in the above-mentioned formula [1]. If visually noticeable noise does not exist in the current macroblock, the judgment result becomes "NO", the flow advances to Step SD8 and executes inter D&Q processing (refer to FIG. 15) to perform inter-frame coding.

Conversely, if visually noticeable noise does exist in the current macroblock, the judgment result of the above-mentioned Step SD7 becomes "YES". The flow advances to Step SD6 and executes inter D&Q processing to perform intra-frame coding and this processing is completed.

Thus, in the third preferred embodiment, the minSAD value obtained by the motion vector search at the time of inter-prediction is substituted as the assessment value which represents the quantization error total amount Σ Noise for the current macroblock made into a coding object. The error status determination roughly judges the magnitude of quantization error by whether or not this minSAD exceeds the threshold TH1. Accordingly, when the quantization error is deemed to be lower, the current macroblock flatness Flat is calculated and whether or not there is visually noticeable noise is judged. If there is no visually noticeable noise, inter-frame coding is selected. Conversely, if there is visually noticeable noise, intra-frame coding is selected.

Meanwhile, when the quantization error is deemed to be higher, whether or not visually noticeable noise exists in the current macroblock is judged while considering the magnitude of the motion vector. If there is no visually noticeable noise, inter-frame coding is selected. Conversely, if there is visually noticeable noise, intra-frame coding is selected.

Accordingly, similar to the first preferred embodiment, the immense number of calculations in intra-prediction processing (refer to FIG. 14) which are executed for coding determination can be omitted. As a result, wasteful calculations will not be performed and coding modes can be determined at a faster speed in view of human visual characteristics. Furthermore, because intra-frame coding is immediately selected if there is visually noticeable noise, quantization error propagation when 'trapped' in a local minimum can be rapidly stopped to avoid reduction in image quality.

D. Fourth Preferred Embodiment

Figure 8:
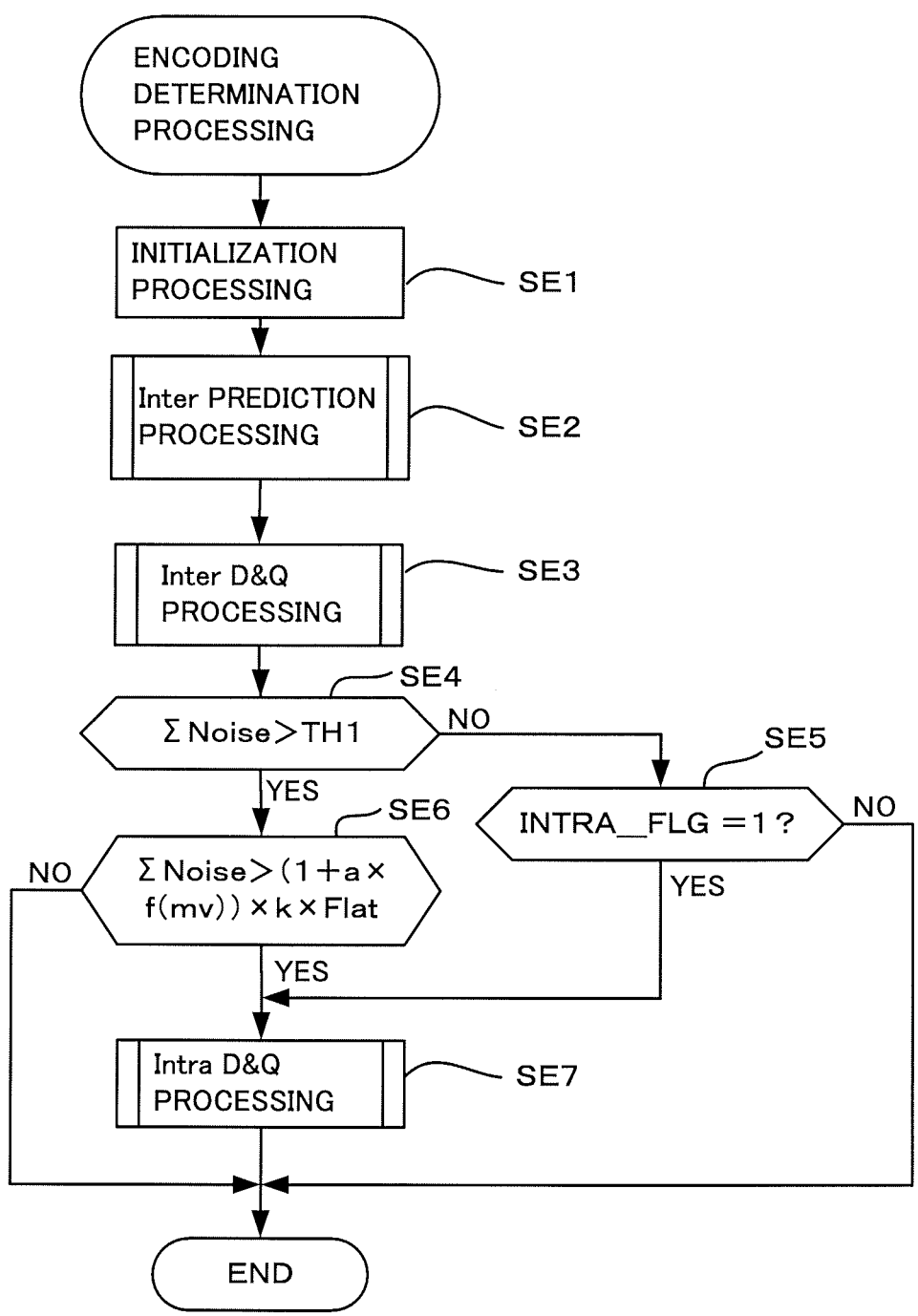
FIG. 8 is a flow chart showing operations of the encoding determination processing according to the fourth preferred embodiment.

Next, the operations of the encoding determination processing according to the fourth preferred embodiment will be explained with reference to FIG. 8. When processing is performed corresponding to an input macroblock similar to the above-mentioned first preferred embodiment and after initializing each section of the device in Step SE1, the flow advances to Step SE2 and inter-prediction processing to estimate the amount of coded data at the time of inter-frame predictive coding is executed. Next, in Step SE3, while performing inter-frame predictive coding, whether or not visually noticeable noise exists in some of the pixels of the current macroblock is judged based on flatness Flat and noise Noise detected in each of the 4×4 pixel blocks. If there is visually noticeable noise, inter D&Q processing (refer to FIG. 5) which sets the flag INTRA_FLG to "1" is executed.

Next, in Step SE4, the sum total of noise Noise is obtained in the inter D&Q processing of the above-mentioned Step SE3. Specifically, whether or not the quantization error total amount Σ Noise in the current macroblock exceeds the threshold value TH1 is judged, namely, the quantization error total amount Σ Noise is lower. When the quantization error total amount Σ Noise is judged to be lower, the judgment result becomes "NO" and the flow advances to Step SE5. In Step SE5, whether or not virtually noticeable noise has been detected in the inter D&Q processing of the above-mentioned Step SE3 is judged, namely, whether or not the flag INTRA_FLG has been set to "1". If visually noticeable noise has been detected, the judgment result becomes "YES". The flow advances to Step SE7 and inter D&Q processing to perform intra-frame coding is executed. Conversely, if noise visually noticeable noise has not been detected, the judgment result of Step SE5 becomes "NO" and this processing is completed.

Meanwhile, when the quantization error total amount Σ Noise is judged to be higher, the judgment result of the above-mentioned Step SE4 becomes "YES" and the flow advances to Step SE7. In Step SE7, whether or not visually noticeable noise exists in the current macroblock is judged while considering the magnitude of the motion vector, based on the criterion expressed in the following formula [2].

$$\Sigma \text{Noise} > (1 + a \times f(mv)) \times k \times \text{Flat} \quad [2]$$

Additionally, in formula [2] the coefficient a is constant to adjust the contributive factor of the motion vector, and the coefficient k is constant equivalent to the inclination of the straight line B mentioned above. Function f (mv) is the size ($u^2 + v^2$) of the current macroblock motion vector (u, v).

If there is visually noticeable noise, the judgment result of the above-mention Step SE6 becomes "YES". The flow advances to Step SE7 and intra D&Q processing to perform intra-frame coding is executed. Conversely, if there is no visually noticeable noise, the judgment result becomes "NO" and this processing is completed.

Thus, in the fourth preferred embodiment, the magnitude of quantization error of the current macroblock is judged by whether or not the quantization error total amount Σ Noise exceeds the threshold TH1. When the quantization error, is lower, whether or not there is visually noticeable noise in some pixels of the current macroblock is judged based on flatness Flat and noise Noise detected in each of the 4×4 pixel blocks of the current macroblock partitioned into 16 sub-macroblocks. If there is visually noticeable noise, intra-frame coding is selected.

Meanwhile, when the quantization error is deemed to be higher, whether or not visually noticeable noise exists in the current macroblock is judged while considering the magnitude of the motion vector. If there is visually noticeable noise, intra-frame coding is selected.

Accordingly, similar to the first preferred embodiment, the immense number of calculations in intra-prediction processing (refer to FIG. 14) which are executed for coding determination can be omitted. As a result, wasteful calculations will not be performed and coding modes can be determined at a faster speed in view of human visual characteristics.

Also, because intra-frame coding will be immediately selected when judged there is visually noticeable noise in the current macroblock based on flatness Flat and noise Noise, quantization error propagation when 'trapped' in a local minimum can be rapidly stopped to avoid reduction in image quality.

Furthermore, although the processing program of the motion picture encoding device which is a preferred embodiment of the present invention is stored in the memory (for example, ROM, etc.) of the motion picture encoding device, this processing program is stored on a computer-readable medium and should also be protected in the case of manufacturing, selling, etc. of only the program. In that case, the method of protecting the program with a patent will be realized by the form of the computer-readable medium on which the motion picture encoding processing program is stored.

While the present invention has been described with reference to the preferred embodiments, it is intended that the invention be not limited by any of the details of the description therein but includes all the embodiments which fall within the scope of the appended claims.

What is claimed is:

1. A motion picture encoding device which selects either interframe coding or intra-frame coding to perform video compression, comprising:
   a motion compensation error detection unit which detects motion compensation error upon interframe prediction;

a detection unit which detects flatness of a macroblock image; and an encoding determination unit which compares the motion compensation error with a product acquired by multiplying the flatness of the macroblock image by a coefficient which increases as a magnitude of a motion vector becomes larger, when the motion compensation error detected by the motion compensation error detection unit is greater than a first value during interframe coding by a macroblock image unit, and selects intra-frame coding if the motion compensation error is greater;

wherein the encoding determination unit selects intra-frame coding if a formula [1] is satisfied:

$$\text{minSAD} > (1 + a \times f(mv)) \times k \times \text{Flat} \quad [1]$$

where minSAD is a minimum Sum of Absolute Differences obtained by a motion vector search, coefficient a is constant to adjust a contributive factor of the motion vector, coefficient k is constant, function f (mv) is a magnitude of a current macroblock motion vector, and Flat is an amount of flatness.

2. The motion picture encoding device according to claim 1, further comprising:

a partitioning unit which obtains block images by partitioning the macroblock image; and a block image determination unit which detects flatness and quantization error of the block images and determines whether any of the block images has visually noticeable noise based on comparison results of: (i) the detected quantization error and a second value, and (ii) the detected flatness and a third value;

wherein the encoding determination unit selects intra-frame coding when the motion compensation error detected by the motion compensation error detection unit is less than the first value, and when the block image determination unit determines that one of the block images within the macroblock image has visually noticeable noise.

3. The motion picture encoding device according to claim 1, wherein the encoding determination unit selects intra-frame coding by comparison of a fourth value and the flatness of the macroblock image detected by the detection unit, when the motion compensation error detected by the motion compensation error detection unit is less than the first value.

4. A motion picture encoding method which selects either inter-frame coding or intra-frame coding to perform video compression, the method comprising:

detecting motion compensation error upon inter-frame prediction;

detecting flatness of a macroblock image; and comparing the motion compensation error with a product acquired by multiplying the flatness of the macroblock image by a coefficient which increases as a magnitude of a motion vector becomes larger, when the detected motion compensation error is greater than a first value during inter-frame coding by a macroblock image unit, and selecting intra-frame coding if the motion compensation error is greater;

wherein intra-frame coding is selected if a formula [1] is satisfied:

$$\text{minSAD} > (1 + a \times f(mv)) \times k \times \text{Flat} \quad [1]$$

where minSAD is a minimum Sum of Absolute Differences obtained by a motion vector search, coefficient a is constant to adjust a contributive factor of the motion vector, coefficient k is constant, function f (mv) is a magnitude of a current macroblock motion vector, and Flat is an amount of flatness.

5. The motion picture encoding method according to claim 4, further comprising:

obtaining block images by partitioning the macroblock image; detecting flatness and quantization error of the block images and determining whether any of the block images has visually noticeable noise based on comparison results of: (i) the detected quantization error and a second value, and (ii) the detected flatness and a third value; and selecting intra-frame coding when the detected motion compensation error is less than the first value during inter-frame coding by the macroblock image unit, and when it is determined that one of the block images within the macroblock image has visually noticeable noise.

6. The motion picture encoding method according to claim 4, further comprising:

selecting intra-frame coding by comparison of a fourth value and the flatness of the macroblock image, when the detected motion compensation error is less than the first value during inter-frame coding by the macroblock image unit.

7. A non-transitory computer-readable storage medium having a program stored thereon which is executable by a computer controlling a motion picture encoding device which selects either inter-frame coding or intra-frame coding to perform video compression, wherein the program causes the computer to perform functions comprising:

detecting motion compensation error upon inter-frame prediction;

detecting flatness of a macroblock image; and comparing the motion compensation error with a product acquired by multiplying the flatness of the macroblock image by a coefficient which increases as a magnitude of a motion vector becomes larger, when the detected motion compensation error is greater than a first value during inter-frame coding by a macroblock image unit, and selecting intra-frame coding if the motion compensation error is greater;

wherein intra-frame coding is selected if a formula [1] is satisfied:

$$\text{minSAD} > (1 + a \times f(mv)) \times k \times \text{Flat} \quad [1]$$

where minSAD is a minimum Sum of Absolute Differences obtained by a motion vector search, coefficient a is constant to adjust a contributive factor of the motion vector, coefficient k is constant, function f (mv) is a magnitude of a current macroblock motion vector, and Flat is an amount of flatness.

8. The non-transitory computer-readable storage medium according to claim 7, wherein the program causes the computer to perform further functions comprising:

obtaining block images by partitioning the macroblock image;

detecting flatness and quantization error of the block images and determining whether any of the block images has visually noticeable noise based on comparison results of: (i) the detected quantization error and a second value, and (ii) the detected flatness and a third value; and selecting intra-frame coding when the detected motion compensation error is less than the first value during inter-frame coding by the macroblock image unit, and when it is determined that one of the block images within the macroblock image has visually noticeable noise.

9. The non-transitory computer-readable storage medium according to claim 7, wherein the program causes the computer to perform a further function comprising:

selecting intra-frame coding by comparison of a fourth value and the flatness of the macroblock image, when the detected motion compensation error is less than the first value during inter-frame coding by the macroblock image unit.

\* \* \* \* \*